July 25, 1944.

A. T. CAHILL 2,354,196

TYPEWRITING MACHINE, TYPESETTING MACHINE,
AND OTHER KEYBOARD INSTRUMENTS
Filed Feb. 3, 1938    10 Sheets-Sheet 1

INVENTOR
Arthur T. Cahill
BY Emery, Booth, Townsend, Miller & Weidner
ATTORNEYS

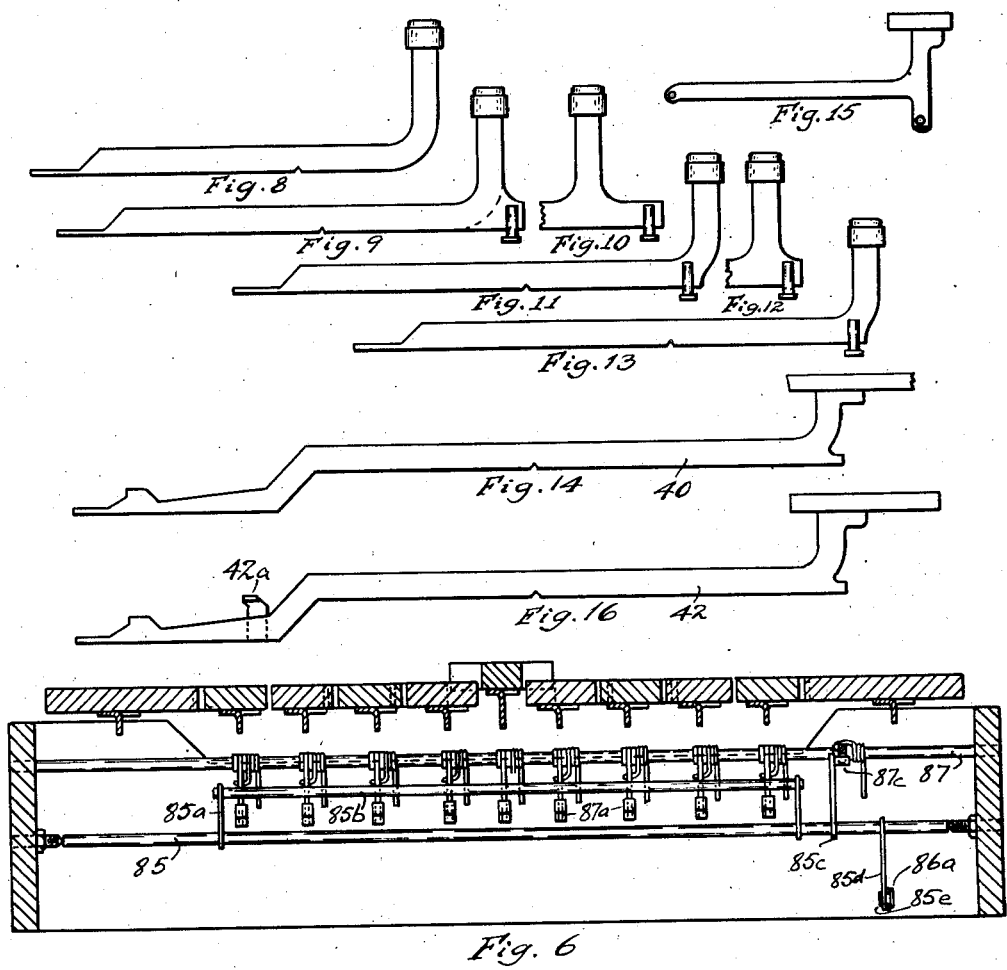

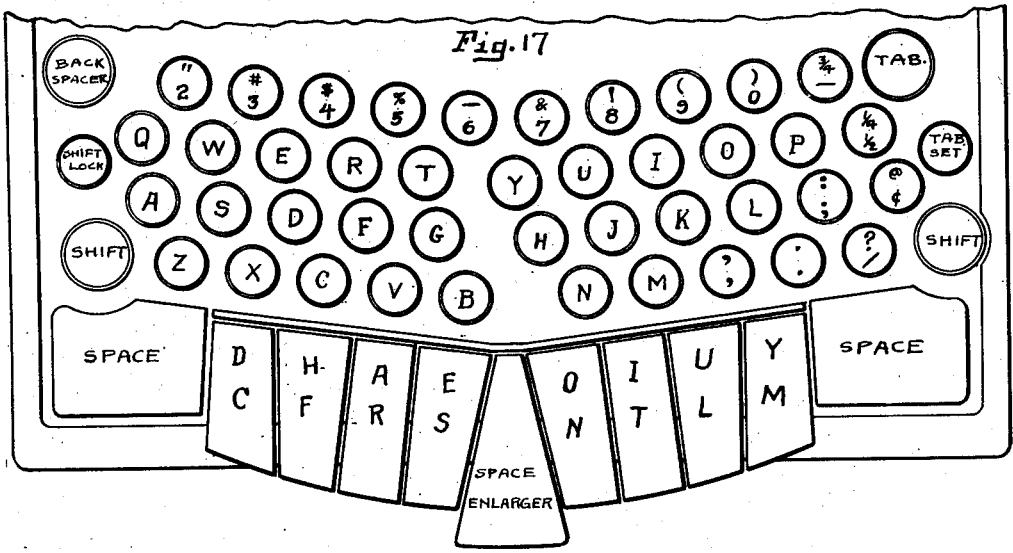
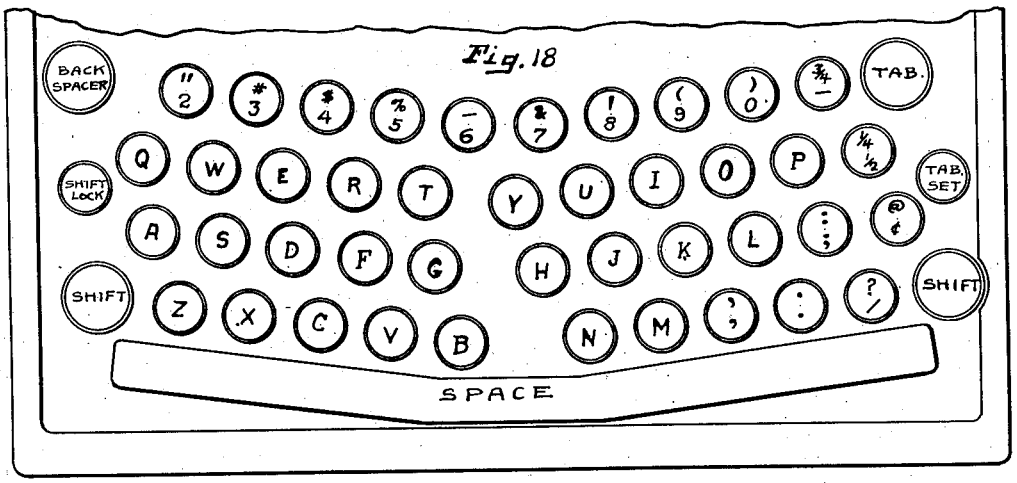
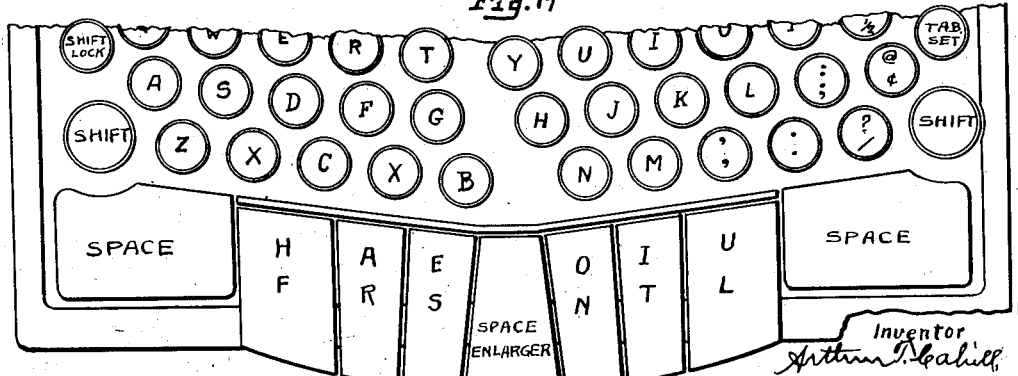

July 25, 1944.   A. T. CAHILL   2,354,196
TYPEWRITING MACHINE, TYPESETTING MACHINE,
AND OTHER KEYBOARD INSTRUMENTS
Filed Feb. 3, 1938   10 Sheets-Sheet 7
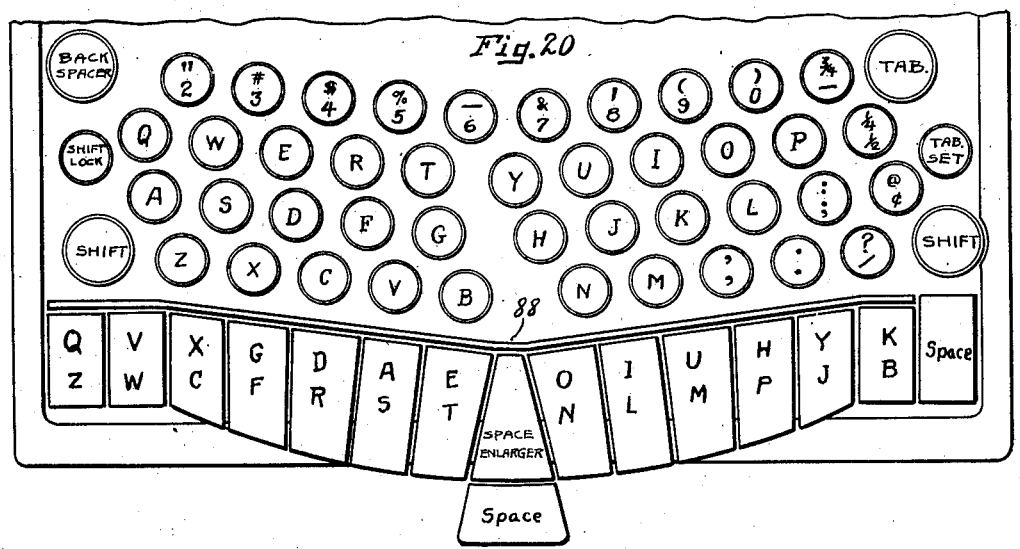
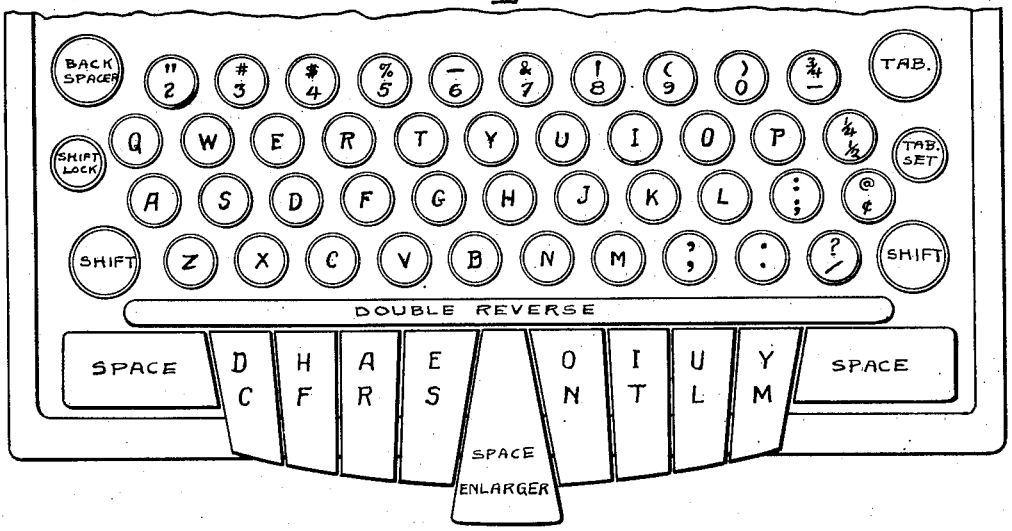
Inventor
Arthur T. Cahill
By Emery, Booth, Townsend, Miller & Weidner
Attorneys.

July 25, 1944. A. T. CAHILL 2,354,196
TYPEWRITING MACHINE, TYPESETTING MACHINE,
AND OTHER KEYBOARD INSTRUMENTS
Filed Feb. 3, 1938 10 Sheets-Sheet 8
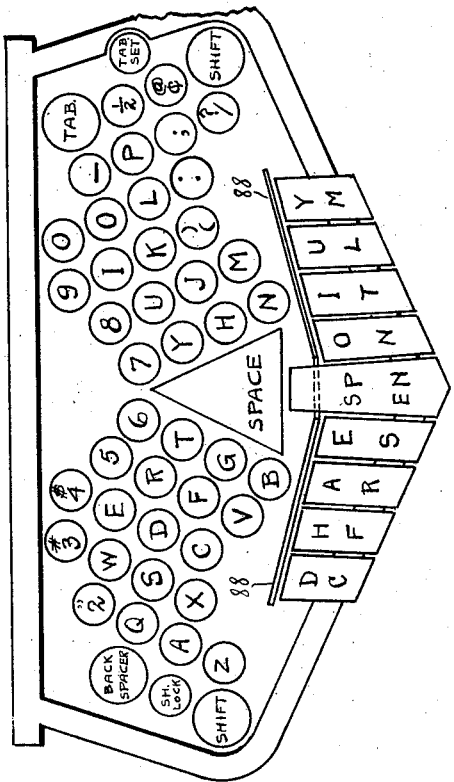
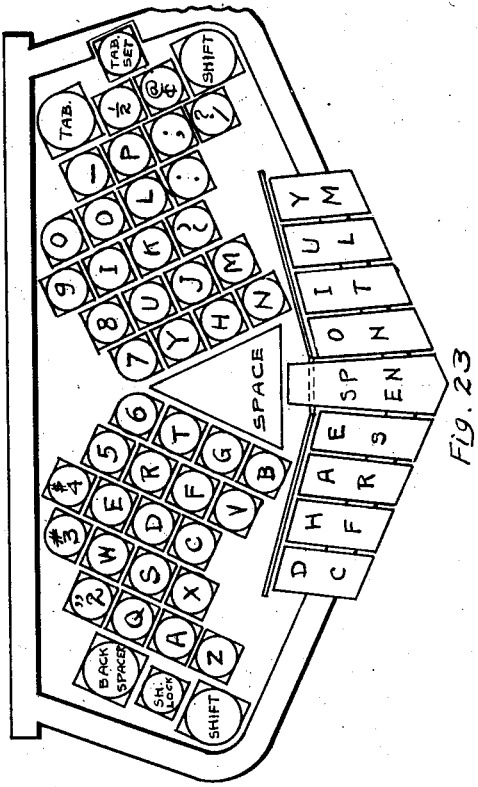
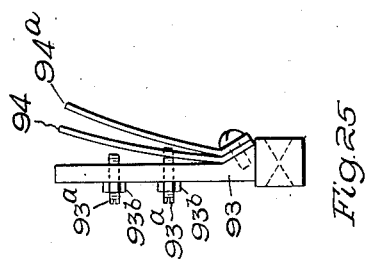
INVENTOR.
Arthur T. Cahill.
Emery, Booth, Townsend, Miller & Weidner
ATTORNEYS.

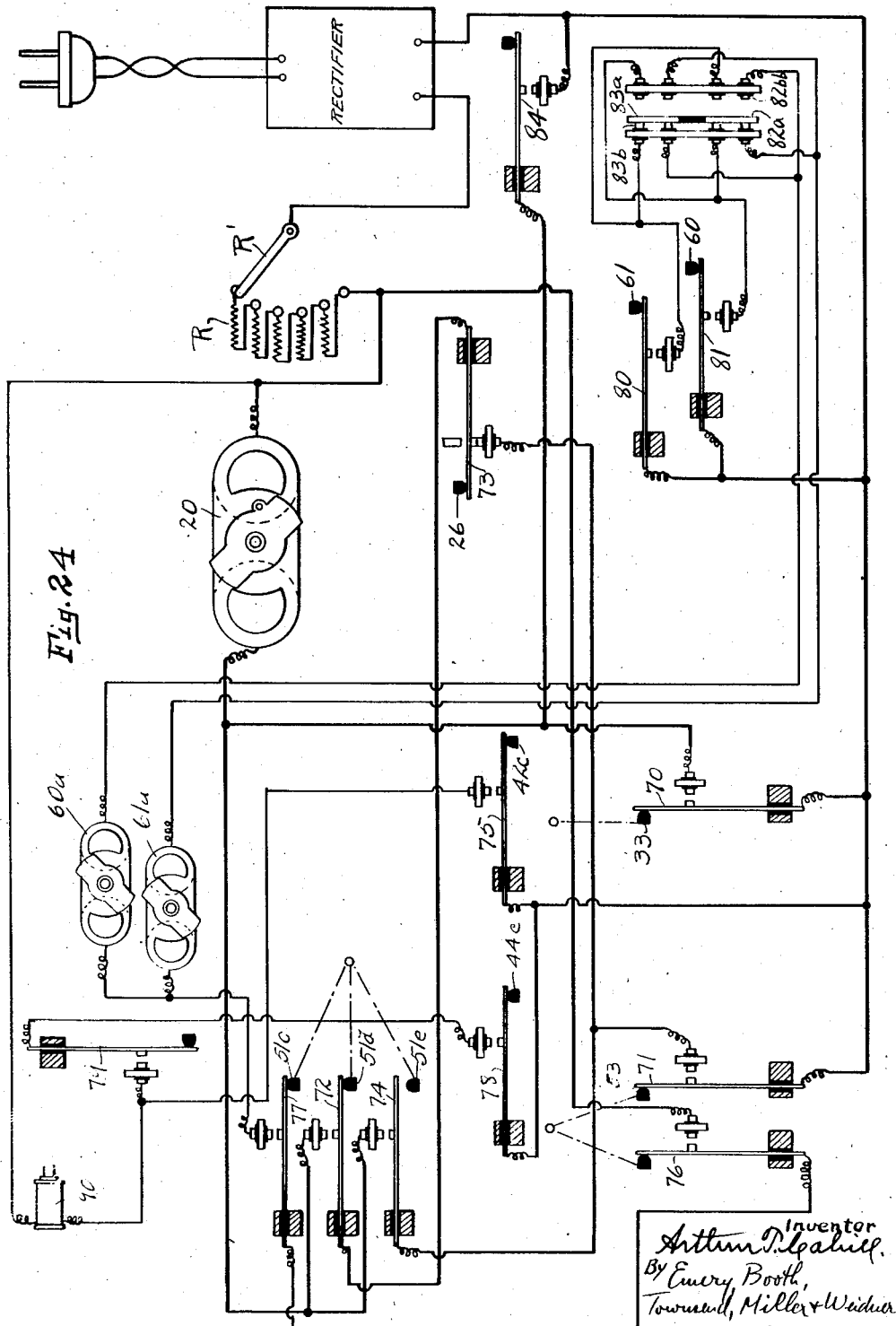

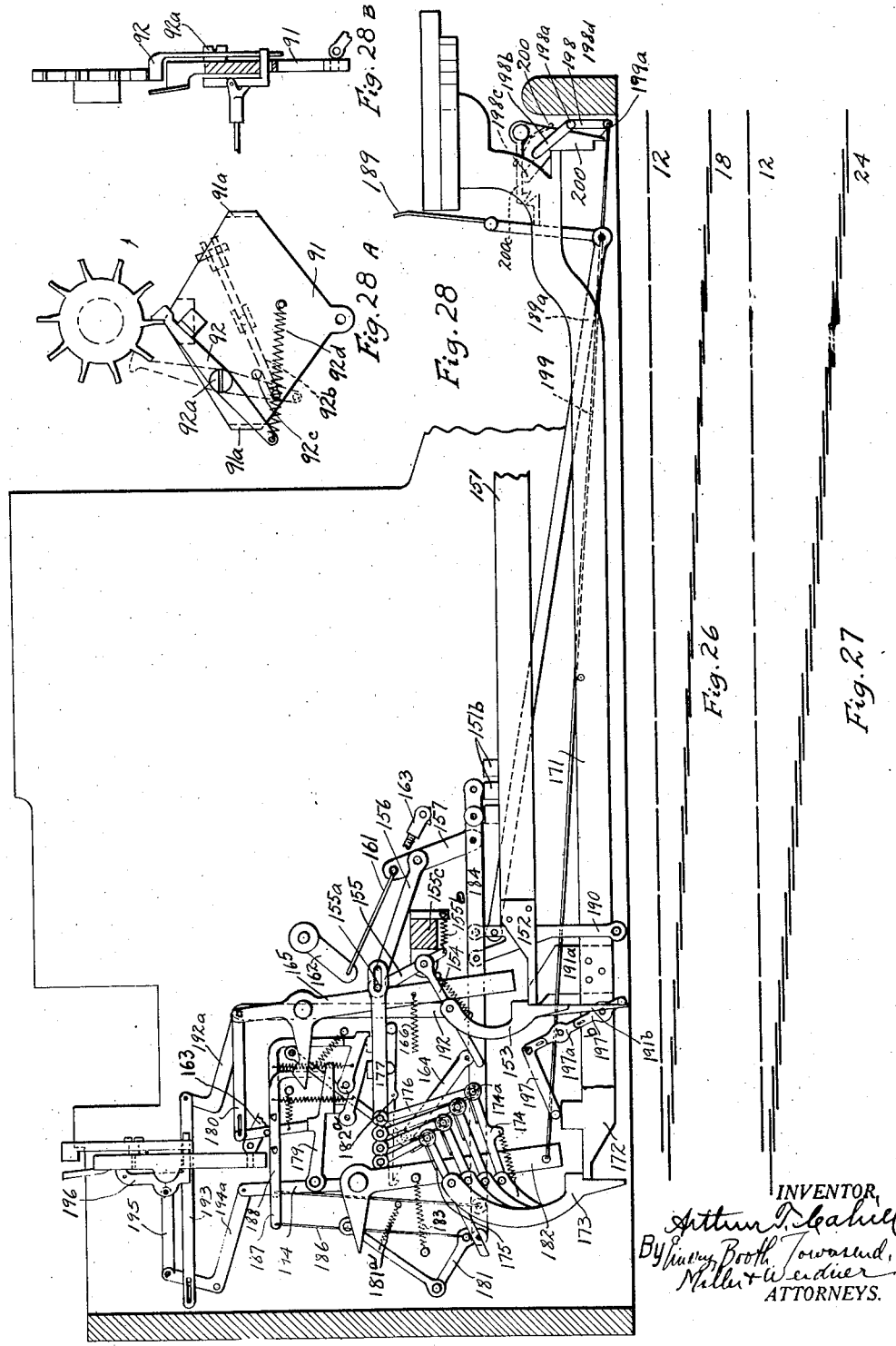

Patented July 25, 1944

2,354,196

UNITED STATES PATENT OFFICE 2,354,196

TYPEWRITING MACHINE, TYPESETTING MACHINE, AND OTHER KEYBOARD INSTRUMENTS

Arthur T. Cahill, Weehawken, N. J.

Application February 3, 1938, Serial No. 188,502

21 Claims. (Cl. 197—14)

My present invention relates to keyboard instruments, especially typewriting machines, and has among its principal objects that of providing novel and improved means facilitating simple and rapid but less energy-consuming operation on the part of the typist, such means being in large part based on the recognition and availing of certain vowel and consonant frequencies and relationships. Other objects will be apparent from the following description in connection with the drawings, including various novel provisions for quiet operation, power actuation, legato action, automatic determination of certain letter and space sequences, and other features and combinations thereof.

In the drawings illustrating by way of example certain embodiments of the invention:

Fig. 1 is a longitudinal section through the mechanism as a whole, as upon the line 1—1 of Fig. 4;

Figs. 2 and 3, the latter a continuation forward of Fig. 2, together present a similar longitudinal section corresponding to a major portion of Fig. 1, on twice the scale of that figure;

Fig. 5 is a detail elevation and perspective view of a rear portion of a key reed and associated parts;

Fig. 6 is a transverse vertical section taken immediately inside the front end of the machine frame, as on the line 6—6 of Fig. 4;

Fig. 7 is a perspective detail of part of the holding and releasing mechanism for the thumb keys;

Fig. 8 is a detail of the key reeds used on the fourth row of keys, the rearmost row on the universal keyboard;

Figs. 9 and 10 are details of the key reeds in the third row of keys, the second row from the back, showing certain reed extensions for operating the vowel and consonant frames;

Figs. 11 and 12 are details of the key reeds in the second row from the front, also showing extensions for operating the vowel and consonant frames;

Fig. 13 illustrates the key reeds in the first or front row of keys, including certain extensions for operating the consonant frame, there being no vowels in this row, in the form shown;

Figs. 14, 15 and 16 are similar views of thumb key, space bar and enlarger key reeds respectively;

Figure 1:
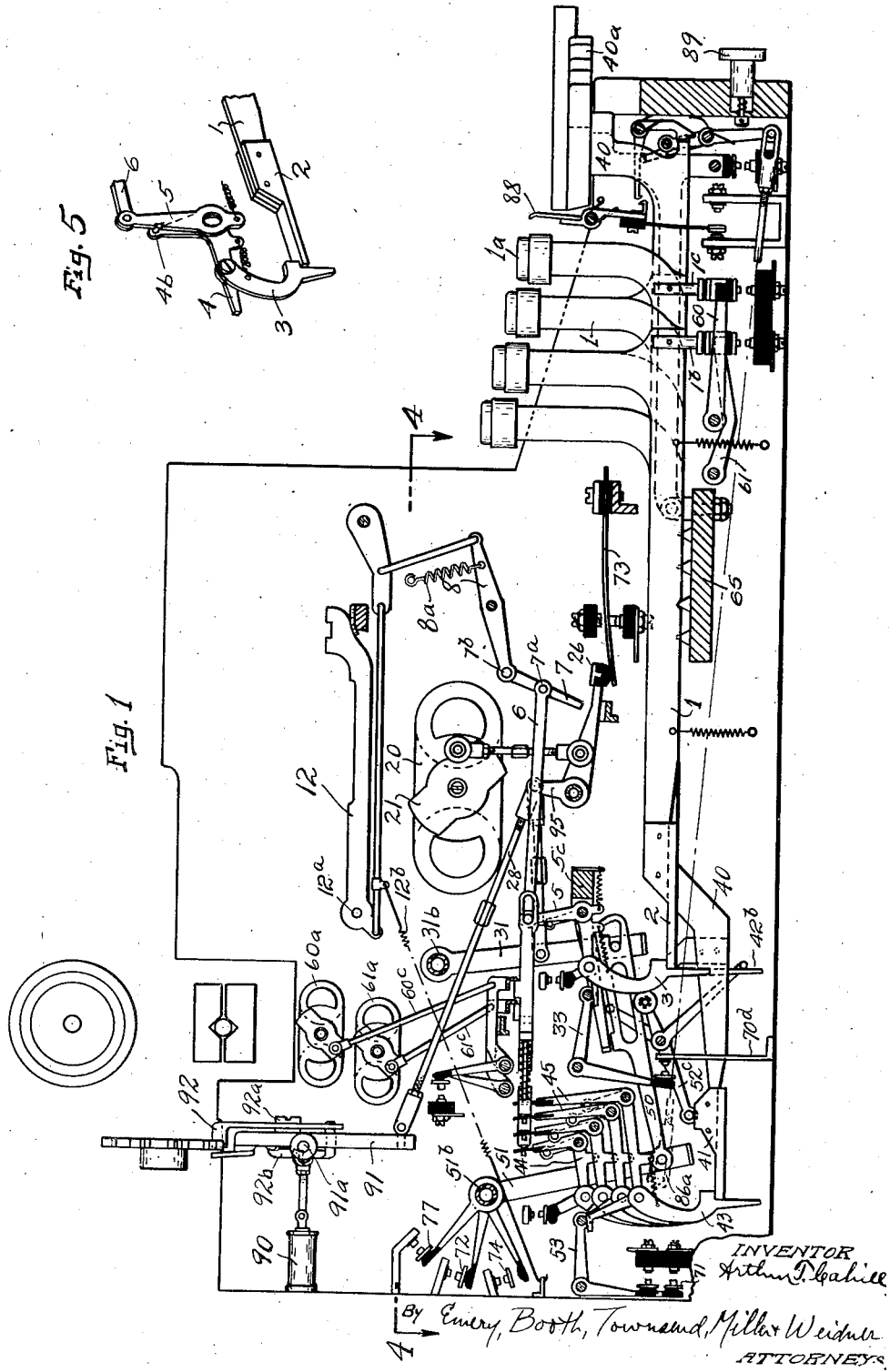

Figs. 17 to 23 inclusive are elevational views of various modifications of the keyboard in accordance with the invention;

Fig. 24 is a wiring diagram typically illustrating various circuits associated with the electrically operated form of the invention;

Fig. 25 is a detailed elevational view of a noise suppressor applicable to one form of carriage mechanism;

Figs. 26 and 27 are diagrams explanatory of speed increases resultant from the legato-action feature of the invention, utilizing a ⅓ and a ½ overlap respectively;

Fig. 28 (on the sheet with diagrammatic Figs. 26 and 27) is a view corresponding to Fig. 1, illustrating a duplex typewriter similar in general principles to the power-operated type of said Fig. 1 but in this instance manually operated;

Figs. 28A and 28B are front and side detail elevational views of spacing mechanism applicable either to the power or the manually operated form of typewriter.

Before describing the illustrative embodiments of the invention with more detailed reference to the drawings, the following additional introductory and general statement as to objectives and principles of the invention should aid in understanding its substance and scope.

Desirably, and as here shown, the typewriting machines concerned incorporate the accepted standard and so-called universal keyboard, and in general form and arrangement resemble such type of machine. Power-operation, conveniently electro-magnetically, is a preferred feature, with the operator's fingers merely controlling the application or release of the power, but it is not indispensible as regards various aspects of the invention, a manually-operated form of machine being included in the present disclosure. A shallow depression of the keys and a legato touch upon them is contemplated, with an associated legato, overlapping and easy rhythm-action, less tiresome for the operator yet productive of more typed work in a given time.

The invention involves the production of a plurality of printing effects, such as two letters or a letter and a space, simultaneously. This involves the provision of a number of extra or special keys which herein for convenience will generally be referred to as thumb keys since desirably they are positioned for convenient operation by the thumbs, it being understood, however, that the term thumb is for identification rather than limitation, as the extra keys may be otherwise operated. While the number of such keys may be considerably varied, an effective number is six or eight, each of them representing two letters and each of them capable of being taken in either of two relations to a preceding letter. The operator is enabled simultaneously to print, at one action instead of two, a letter and a space, two letters, the last letter of a word and the inter-verbal space for all words having an odd number of letters, and also to print simultaneously the last two letters of a word and the inter-verbal space simultaneously, in the case of even lettered words, at one action instead of three. The determination as to which of two available letters shall be effected by a given special thumb key is largely automatically made by the machine itself, in general a consonant automatically following a vowel, and a vowel a consonant, all with the avoidance of ever having to depress more than one key at a time to produce one individual letter, as ordinarily required where a number of keys less than the number of letters of the alphabet is used. In printing letters in pairs the first letter of such pair is taken on the universal keyboard whose keys are always live, in contrast to the special or thumb keys which are dead or inactive until conditioned by the printing of a letter on the universal keyboard.

Other inventive features will be apparent including those of convenient key positioning and the provision for substitial noiseless power-operation.

Without here setting out in detail the various facts resultant from an analytical study of the nature of words and their spelling in the English language, and in view of which the duplex method of operation here involved is made practicable, it is sufficient to note that the letters of the alphabet may be classified as vowels or characters which behave as vowels, as to frequency of occurrence and probability of following a consonant and as consonants and characters behaving like consonants, with respect to their likelihood of appearance always after vowels. Accordingly, I propose to provide an appropriate number of the special or thumb keys, such as six, eight or even as many as fourteen, each of which corresponds to two different letters, one of them a vowel or vowel type letter and the other a consonant or a consonant type letter. It will be understood that generally herein the terms vowel and consonant include not only those letters as commonly considered but also those which tend to act like them respectively, as to their vowel-following or their consonant-following frequency. And in the provision of my special or thumb keys advantage also is taken of other noted characteristics of the English language, such as the likelihood of certain letters to occur more often or come in the even numbered positions, that is, as the second, fourth, sixth, eighth, etc., letter of a word.

While the facts such as mentioned as to letter occurrence were largely appreciated and to some extent availed of by my late brother, Dr. Thaddeus Cahill, in the provision of his machines of the combination or permutation type, those machines frequently required the use of two or more fingers for the production of a single letter, and involved high skill and a long period of special training for the operator. My present invention, however, eliminates any such plural keying for a single letter and provides a machine including a standard or universal keyboard, always available to any operator accustomed to such keyboard but also incorporating my special or thumb keys for duplex work, the performance of which may be acquired gradually or otherwise as circumstances and the capacity of the particular operator permit.

In accordance with the invention it thus is made possible, while using the present touch typewriting system, to print letters in pairs, instead of singly, simply by printing the first letter, the primary or leading letter, with a finger on the universal keyboard, just as it is done now, and the secondary or following letter of the pair simultaneously, by dropping the thumb onto a thumb key as the finger is dropped onto the finger key, the thumb and finger acting simultaneously, and this rotation of actions will be continued to the end of the word, no matter how long it may be, the first, third, fifth, seventh, etc., letters being taken on the universal keyboard, and the second, fourth, sixth, eighth, etc., letters being depressed simultaneously by the thumb when the finger depresses the finger key on the universal keyboard. Operation in accordance with my invention is further facilitated by an exceedingly light touch and shallow depression of the keys, as well as by an easy legato action, which permits the operator to keep the fingers on the keys after the letters have been printed and does not necessitate the quick, jerky, staccato action to get off the keys instantly, which is necessary on the present manually operated machine.

*List of parts and their reference numerals*

In the following specification and the accompanying drawings, similar numbers or letters are used for similar parts:

1, 1, are the key reeds of the universal machine.

$1^a$, $1^a$, are the finger keys on the key reeds of the universal keyboard.

$1^b$, $1^b$, are the extensions on the key reeds that operate the vowel operated consonant releasing contact frame 61.

$1^c$, $1^c$, are the extensions on the key reeds that operate the consonant operated vowel releasing contact frame 60.

$1^d$ is the tabulator key reed.

$1^e$ is the back spacer key reed.

2, 2, are the extensions on the key reeds for the jacks.

3, 3, are the jacks.

$3^a$, $3^a$, are the shoulder pivots which connect the jacks 3 with the bell crank levers 4.

$3^b$, $3^b$, are springs connecting 3 and 4, which return 3, 3, to their normal positions.

4, 4, are the bell crank levers.

$4^a$ is the rod or fulcrum on which the bell cranks 4, 4, and the levers 5, 5, are mounted and oscillate.

$4^b$, $4^b$, are pins in 4, 4, which push the levers 5, 5, ahead of them.

5, 5, are levers mounted on $4^a$.

$5^a$, $5^a$, are the shoulder pivots which connect the levers 5, 5, with the push rods 6, 6.

$5^b$, $5^b$, are returning springs which return the levers 5, 5, push pieces 6, 6, and pendants 7, 7, to their normal positions.

$5^c$ is a milled bar mounting for the bell cranks 4, 4, and levers 5, 5.

$5^d$ is a thin strip of metal to which one end of the springs $5^b$, $5^b$, are attached.

6, 6, are the push rods receiving motion from the levers 5, 5, and imparting it to the pendants 7, 7.

7, 7, are pendants, thrown over the motor frame 26 by the push rods 6, 6.

$7^a$, $7^a$, are shoulder pivots connecting the pendants 7, 7, with the push rods 6, 6.

7ᵇ, 7ᵇ, are the pivots connecting the pendants 7, 7, with the levers 8, 8.

8, 8, are the levers which receive movement from the pendants 7, 7, at one end and impart it through the pull-down wires 9, 9, connected at the other end, to the levers 10, 10, which, through the wires 11, 11, impart movement to the type bars 12, 12.

8ᵃ, 8ᵃ, are returning springs which return the pendants 7, 7, levers 8, 8, and pull-down wires 9, 9, to their normal positions.

9, 9, are the pull-down wires connecting the levers 8 and 10.

10, 10 are the type bar actuating levers.

10ᵃ is the rod or fulcrum on which the levers 10, 10 oscillate.

11, 11, are the wires which impart motion from the levers 10, 10, to the type bars 12, 12.

12, 12 are the type bars pivoted at 12ᵃ.

12ᵃ is the semi-circular wire fulcrum on which the type bars 12 are mounted and oscillate.

12ᵇ, 12ᵇ, are the type bar returning springs.

20 is the two pole rotary motor magnet.

21 is the oscillating magnetic armature which, through the motor frame, imparts motion to the pendants 7, 7. It also, through the arm 27 on the motor frame shaft and the push rod 28, connected to said arm and to the spacing mechanism, imparts motion to the spacing mechanism. It also, by means of another arm, 29, on the motor frame shaft, imparts motion to the knockout frames 31 and 51, through the push rod 30. It also, through another similar arm 95, and the push rod 96, imparts motion to the bell crank 97 whose pawl 98 constantly winds up the motor spring for the revolving platen or carriage.

21ᵃ is a stud or pivot set fast in the armature 21 and connecting 21 and 21ᶜ.

21ᵇ is a cloth felt bushing between stud 21ᵃ and connecting head 21ᶜ to suppress noise.

21ᶜ is the connecting head of non-magnetic metal.

21ᵈ is a check nut on connecting rod 25.

22 is a stud set fast in the frame of the magnet 20, on which the armature 21 revolves.

23 is a bushing of brass, bronze or other non-magnetic material forced into the armature 21 and reamed to fit the stud 22.

24 is the whistler spring to return the parts to their normal positions.

25 is an adjustable connecting rod, connecting the armature 21 with the motor frame 26.

26 is the motor frame.

26ᵃ is the connecting head connecting 25 and 26.

26ᵇ is the stud in motor frame 26.

26ᶜ is the cloth felt bushing.

27 is an arm on the motor frame 26, which actuates the spacing mechanism.

27ᵃ is a pivot connecting the arm 27 and push rod 28.

28 is the adjustable push rod which operates the spacing mechanism.

28ᵃ, 28ᵃ, are connecting heads screw-threaded on the rod 28 for better adjustment.

28ᵇ is a lock nut on 28.

29 is another arm similar to 27 on the motor frame shaft to operate the knockout frames 31 and 51.

29ᵃ is a pivot connecting 29 and 30.

30 is the adjustable push rod which connects 29 with the knockout frame 31.

30ᵃ, 30ᵃ, are the connecting heads on the push rod 30.

30ᵇ is the pivot connecting the push rod 30 and knockout frame 31.

30ᶜ, 30ᶜ are locknuts on rod 30.

30ᵈ, 30ᵈ are connecting heads for rod 30.

21 is the first or universal keyboard knockout frame.

31ᵃ is the shouldered pivot connecting 31 and 50.

31ᵇ is the tube or rod to which the upwardly extending arms of the U-shaped piece 31 are made fast so making the whole into a tight and stiff frame.

33 is the contact frame lying over the tails of the bell crank levers. It is operated by the keys of the universal keyboard.

33ᵃ is the whistler spring which returns frame to its normal position.

40, 40 are the thumb key reeds.

40ᵃ, 40ᵃ are the tablets attached to 40, 40 for the thumbs to operate.

41, 41, are the key extensions on the key reeds 40, 40, which operate the jacks 43, 43.

42 is the double spacer or space enlarger thumb key reed.

42ᵃ is an extension on 42 to operate the specially-long jack 42ᵇ.

42ᵇ is the specially-long space enlarger jack for 42.

43, 43 are the thumb key jacks.

43ᵃ, 43ᵃ, are the shoulder pivots connecting jacks 43 with bell cranks 44.

43ᵇ, 43ᵇ are the springs conecting the jacks 43, 43 with the bell crank levers 44, 44 and which return the jacks to their normal positions.

44, 44, are the bell cranks.

44ᵃ, 44ᵃ, are the rock shafts on which the bell cranks 44, 44, are mounted fast, while the levers 45, 45, also mounted on these shafts, are free to oscillate.

44ᵇ, 44ᵇ, are the pins which shove the levers 45, 45 before them.

44ᶜ is a lever, which, under the action of the jack 43, moves the spring 78 into contact with the point 78ᵇ.

45, 45, are levers which shove the bushings 46ᵇ, 46ᵇ, ahead of them.

46, 46, are push rods which operate the vowel pendants represented by the thumb keys.

46ᵃ, 46ᵃ, are extensions on the push rods 46, by which the frame 60ᵇ holds back the thumb key operated vowels until they are released by the action of the magnet 60ᵃ.

46ᵇ, 46ᵇ, are bushings which are moved by the levers 45, 45, and compress the spiral springs 46ᶜ.

46ᶜ, 46ᶜ, are spiral springs sliding on rods 46ᵈ, as bushings 46ᵇ, 46ᵇ, compress them.

46ᵈ, 46ᵈ, are rods made fast to rearward bent-over ends of 46, 46, and 47, 47, and on which the springs 46ᶜ, 46ᶜ, slide.

47, 47, are the push rods which operate the consonant pendants represented by the thumb keys.

47ᵃ, 47ᵃ, are extensions on push rods 47, by which the frame 61ᵇ holds back the thumb key operated consonants until they are released, by the action of the magnet 61ᵃ.

49 is a latch or pawl to hold 50 in its second position.

50 is a push piece or link connecting knockout frames 31 and 51.

51 is the second or thumb key knockout frame.

51ᵃ is a shouldered pivot connecting the link 50 and thumb key knockout frame 51.

51ᵇ is the tube or rod to which the upwardly extending arms of the U-shaped piece 51 are made fast, so making the whole into a light stiff frame.

51ᶜ, 51ᵈ and 51ᵉ are circuit closing arms fast on 51ᵇ.

51ᶜ closes a circuit at 77.

51ᵈ closes a circuit at 72; and

51ᵉ closes a circuit at 74.

52 is an oscillating frame, consisting, as shown in the drawing, of a rear tube 52ᵃ, carried by arms 52ᶜ, 52ᶜ, fast on the front tube 52ᵇ. The front tube 52ᵇ is set on hardened trunnions. To the front tube of this frame are attached fast three arms, one of which is an upwardly and forwardly extending arm, 52ᵈ.

52ᵈᵈ is a shouldered pin set in 52ᵈ.

Another shorter upwardly and forwardly extending arm, 52ᵉ, is attached to this frame, which carries a grooved wheel 52ᶠ, at its outer end, on which the connecting rod 50 rolls, when the universal keys are used, and which drops out of the way and allows the connecting rod 50 to drop after a letter has been printed on the universal keyboard, and before the following letter, represented by a thumb key, has printed. The third arm—the downwardly and forwardly extending arm 52ᵍ—pulls the specially long jack 42ᵇ for the thumb key space enlarger bar off the extension 42ᵃ, on the thumb key space enlarger bar 42.

52ᵃ is the rear tube of this frame.

52ᵇ is the front tube of this frame.

52ᶜ, 52ᶜ, are the side bars of this frame.

52ᵈ is an arm of this frame which controls the latch 49.

52ᵉ carries the grooved wheel 52ᶠ.

52ᶠ is the grooved wheel carried by 52ᵉ.

52ᵍ is the arm that controls the movements of the space enlarger jack 42ᵇ.

53 is the contact frame for the thumb keys, actuated by the bell cranks 44.

53ᵃ is the whistler spring which returns it to its normal position.

60 is the contact frame which is actuated by the consonant keys and which controls the action of the magnet 60ᵃ, and releasing frame 60ᵇ, which releases the vowels.

60ᵃ is the vowel releasing magnet.

60ᵇ is the vowel releasing frame.

60ᶜ is the wire connecting the rotating armature of 60ᵃ with the frame 60ᵇ.

60ᵈ is the arm on the releasing frame 60ᵇ, which closes the circuit of the space enlarger magnet 90.

61 is the contact frame which is actuated by the vowel keys and which controls the action of the magnet 61ᵃ and releasing frame 61ᵇ which releases the consonants.

61ᵃ is the consonant releasing magnet.

61ᵇ is the consonant releasing frame.

61ᶜ is the wire connecting the rotating armature of 61ᵃ with the frame 61ᵇ.

61ᵈ is an arm on the releasing frame 61ᵇ, which closes the circuit of the space enlarger magnet 90.

62 is the stop on which the releasing frames 60ᵇ and 61ᵇ normally rest.

Figure 3:
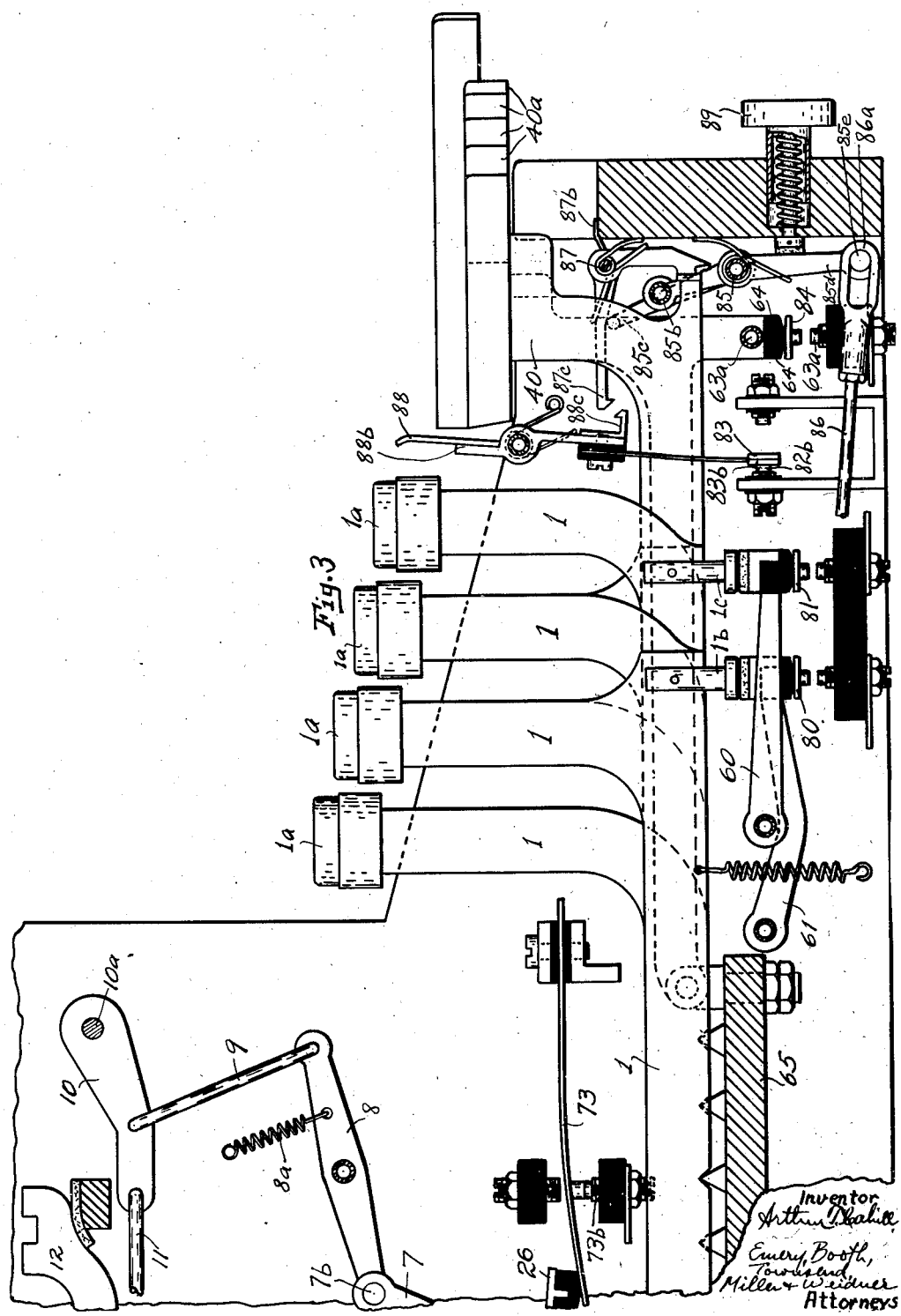

63, 63 are key reeds for the single space bar. One is seen in dotted lines back of the thumb key reed 40 in Fig. 3. Near the front they have downward extensions which are connected into a frame by being made fast to the rod 63ᵃ.

63ᵃ is the rod on which 63, 63 are fastened.

64 is a piece of insulation on said frame.

65 is the key reed fulcrum bar.

*Concerning the contact springs, points, supports, screws, nuts and lugs for same*

Since there are a large number of circuits in this machine, some of which are not simple circuits, and since contact springs, points, screws, nuts, lugs and supports for contacts are all old and well known in the art, it seems useless to list them all out each time. I have, therefore, adopted the following rule which applies in all cases:

The numeral itself is a contact carrying spring, normally under slight tension.

The numeral and ᵃ is a contact point carried by the spring.

The numeral and ᵇ is a contact point fast in the end of a screw.

The numeral and ᶜ is the screw, which carries the contact point.

The numeral and ᵈ is the insulated support for the screw.

The numeral and ᵉ is the lug for soldering the wire into.

The numeral and ᶠ is a locknut for holding the screw in whatever position it may be adjusted.

Since micrometric adjustments are necessary where a number of actions take place at great speed and which have to be timed very accurately so as to follow each other in proper sequence, contact points set in screws are used in all cases. In some cases in the drawings all the parts are shown, and in others, where there is not room, they are illustrated diagrammatically.

70 is the contact carrying spring which the downwardly extending arm of the contact frame 33 pushes over against the fixed contact 70ᵇ, so closing the main circuit of the motor magnet 20—the circuit which is closed by the keys of the universal keyboard.

The thumb key operated motor magnet circuit is not a simple circuit. It is a compound circuit with four breaks in it, as follows:

71 is the contact carrying spring which the downwardly extending arm of the thumb key contact frame 53 presses over against the contact point 71ᵇ, thus closing the first gap in the thumb key circuit of the motor magnet 20.

72 is the contact carrying spring which is pressed over against the fixed contact 72ᵇ, under the impulse of the arm 51ᵈ, of the thumb key knockout frame 51, thus closing the second gap in this circuit.

73 is the contact carrying spring pressed over against the fixed contact point 73ᵇ by the motor frame 26 as it returns to its normal position, thus closing the third gap in the circuit of the motor magnet 20.

74 is the contact carrying spring which, under the second impulse of the arm 51ᵉ, carried by the thumb key operated knockout frame 51, is pressed over against the fixed contact point 74ᵇ, and thus closes the fourth and last circuit of the thumb key operated circuit to the motor magnet 20.

75 is the spring which closes the circuit of the space enlarger magnet 90. This is a simple circuit, with only this one break in it. It is operated by the universal keyboard keys only.

The releasing magnet circuit is also a compound circuit. It has two breaks in it, as follows:

76 is the contact carrying spring which, under the impulse of the downwardly extending arm of the thumb key actuated contact frame 53, closes the common return of the releasing magnets 60ᵃ and 61ᵃ. This circuit has a break in it at 77, which is closed later.

77 is the contact carrying spring which, under the impulse of the arm 51ᶜ, of the thumb key operated knockout frame 51, closes the common return of the releasing magnets 60ᵃ and 61ᵃ.

The space enlarger circuit is also a compound circuit. It has two breaks in it, as follows:

78 is the contact carrying spring which, under the impulse of the space enlarger key, transmitted through a jack 43 and a lever 44ᶜ, is moved against the contact point 78ᵇ, and so closes the common return of the space enlarger magnet 90 at this point. There is a break in this circuit which is closed later, at 79.

79 is the contact carrying spring which, under the impulse of the upwardly extending arms, either 60ᵈ or 61ᵈ, both of which are operated by the releasing magnets 60ᵃ and 61ᵃ, closes the common return of the space enlarger magnet 90.

80 is the contact carrying spring which, under the impulse of the vowel operated consonant releasing frame 61, is forced into contact with the contact point 80ᵇ, so closing the circuit of the vowel operated consonant releasing magnet 61ᵃ, which pulls up the frame 61ᵇ, so releasing the consonants.

81 is the contact carrying spring which, under the impulse of the frame 60, the consonant operated vowel releasing frame, closes the circuit of the releasing magnet 60ᵃ which operates the releasing frame 60ᵇ and releases the vowels.

82 and 83 are two similar spring contactors, each of which carries a contactor at right angles to its own axis, which is long enough to make contact with two contact points. The contactors are normally spring pressed against the contact points, 82ᵇ and 83ᵇ, in the rearward position, and so close the circuits of the releasing magnets 60ᵃ and 61ᵃ. When the double reversing lever is pressed backward by the thumb, the contactors are thrown over into contact with the other set of contact points, 82ᵇᵇ and 83ᵇᵇ, whose wires leading to the magnets have been reversed so that a different magnet acts, when the spring is in the forward position, from the one which acts when it is in the rear position.

84 is the contact spring, which, under the action of the single spacer, is thrown against the fixed contact point 84ᵇ, so closing the circuit of the motor magnet, which acts without printing a letter to make a blank space.

85 is the knockout frame for the thumb keys and double reversing hold down dogs.

85ᵃ is the shaft for above frame.

85ᵇ is the upper arm of frame which releases the thumb keys.

85ᶜ is the arm of the frame 85, which releases the double reversing lever.

85ᵈ is the lower arm of the frame 85, which is pulled by the pull rod 86.

85ᵉ is the pin fast on the arm 85ᵈ.

86 is the pull rod actuated by the knockout frame.

86ᵃ is the connecting head for the pull rod 86.

87, 87, are the dogs which hold the thumb keys down.

87ᵃ is the shaft on which the dogs 87 and 87ᶜ are pivoted.

87ᵇ is the whistler spring for the dogs 87 and 87ᶜ.

87ᶜ is the hold down dog for the double reverser.

88 is a double reversing lever.

88ᵃ is the pivot.

88ᵇ is the casting to which the lever 88 is attached.

88ᶜ is the latch for the lever 88.

89 is the finger release for thumb keys and double reversing lever.

90 is the space enlarger magnet.

91 is the oscillating plate which carries the spacing mechanism.

91ᵃ, 91ᵃ are the bearings on which it oscillates.

92 is the fly dog.

92ᵃ is the shoulder screw on which the fly dog is mounted.

92ᵇ is the movable fly dog stop.

92ᶜ is the set fly dog stop.

92ᵈ is the spring that actuates the fly dog.

93 is the carriage return noise suppressor and spring shock absorbing casting.

93ᵃ, 93ᵃ, are adjusting screws for springs 94 and 94ᵃ.

93ᵇ, 93ᵇ are adjusting screw locknuts.

94 is the stronger shock absorbing and noise suppressing spring.

94ᵃ is the weaker shock absorbing and noise suppressing spring.

*The following numbers refer to my manually-operated duplex typewriter*

151, 151 are the key reeds.

151ᵇ, 151ᵇ are the extensions on the key reeds that operate the vowel operated consonant releasing frames.

151ᶜ, 151ᶜ are the extensions on the key reeds that operate the consonant-operated vowel releasing frames.

152, 152 are the key reed extensions for the jacks.

153, 153 are the jacks.

154, 154, are the bell crank levers.

154ᵃ, 154ᵃ are the rods on which the bell crank levers are mounted.

155, 155, are the bell crank operated levers.

155ᵃ, 155ᵃ are the shoulder pivots in levers 155.

155ᵇ, 155ᵇ are the lever returning springs.

155ᶜ is the milled bar mounting for the bell crank levers.

155ᵈ is a thin metal strip to which the springs 155ᵇ are attached.

156, 156 are the push rods that operate the levers 157, 157.

157, 157 are the levers which pull the type bars.

161, 161 are the wires which impart motion from the levers 157, 157 to the type bars 162, 162.

162, 162 are the type bars.

163 is the adjustable pull rod which operates the spacing mechanism.

164 is the bell crank lever which operates the knockout frame.

165 is the knockout frame.

166 is the spring which actuates the knockout frame.

171, 171 are the thumb key reeds.

172, 172 are the key reed extensions for the jacks 173, 173 whose upward extension operates the selector for space enlarger.

173, 173 are the jacks.

174, 174 are the levers.

174ᵃ, 174ᵃ are the rods on which the levers are mounted.

175, 175 are the whistler springs which push the rods 177 through the lever 176.

176 is the lever that pushes the rod 177.

177 is the push rod which operates the vowels represented by the thumb keys.

178 is the push rod which operates the consonants represented by the thumb keys.

179 is the holding frame for the consonants and vowels.

180 is the releasing connecting lever from the knockout frame 165 to the frame 179.

181 is the bell crank lever which operates the knockout frame 182.

181a is the spring that returns the bell crank 181 to normal.

182 is the knockout frame.

182a is the holding latch for the knockout frame 182.

183 is the actuating spring for the knockout frame.

184 is the vowel releasing frame actuating lever.

185 is the consonant releasing frame actuating lever.

186 is the pull wire that operates from the vowel releasing frame 184 to the vowel releasing frame 187.

187 is the vowel releasing frame.

188 is the consonant releasing frame.

189 is the double reversing lever.

189a is the connecting rod from the double reversing lever to the frame 190.

190 is the double reversing pivoting frame.

191 is the double spacer key reed.

191a is the double spacer key reed extension.

191b is the specially long space enlarger jack.

192 is the special bell crank for the double spacer jack 191b.

192a is the connecting bell crank between 192 and 193.

193 is the double spacer push rod.

194 is the special bell crank for the double spacer jack, which is operated by the thumb keys.

194a is the connecting bell crank between 194 and the pull rod 195.

195 is the pull piece, actuated by 194, which moves the double spacer fly dog stop.

196 is the movable fly dog stop.

197 is the bell crank which operates the connecting links 197a and 197b which pull the double spacer jack 191b off the key extension 191a.

197a is the link connected to bell crank 197.

197b is the link connected to link 197a.

198 is the knockout frame for the thumb keys and double reversing hold down dogs.

198a is the shaft for above frame.

198b is the upper arm of frame 198 which releases the thumb keys.

198c is the arm of the frame 198 which releases the double reversing lever.

198d is the lower arm of frame 198 which is pulled by the pull rod 199.

199 is the pull rod actuated by the knockout frame 182.

199a is the connecting head for the pull rod 199.

200, 200, are the dogs which hold the thumb keys down.

200a is the shaft on which the dogs 200 and 200c are pivoted.

200b, 200b, are the whistler springs for the dogs 200 and 200c.

200c is the hold down dog for the double reverser.

Method of operation

Figure 4:
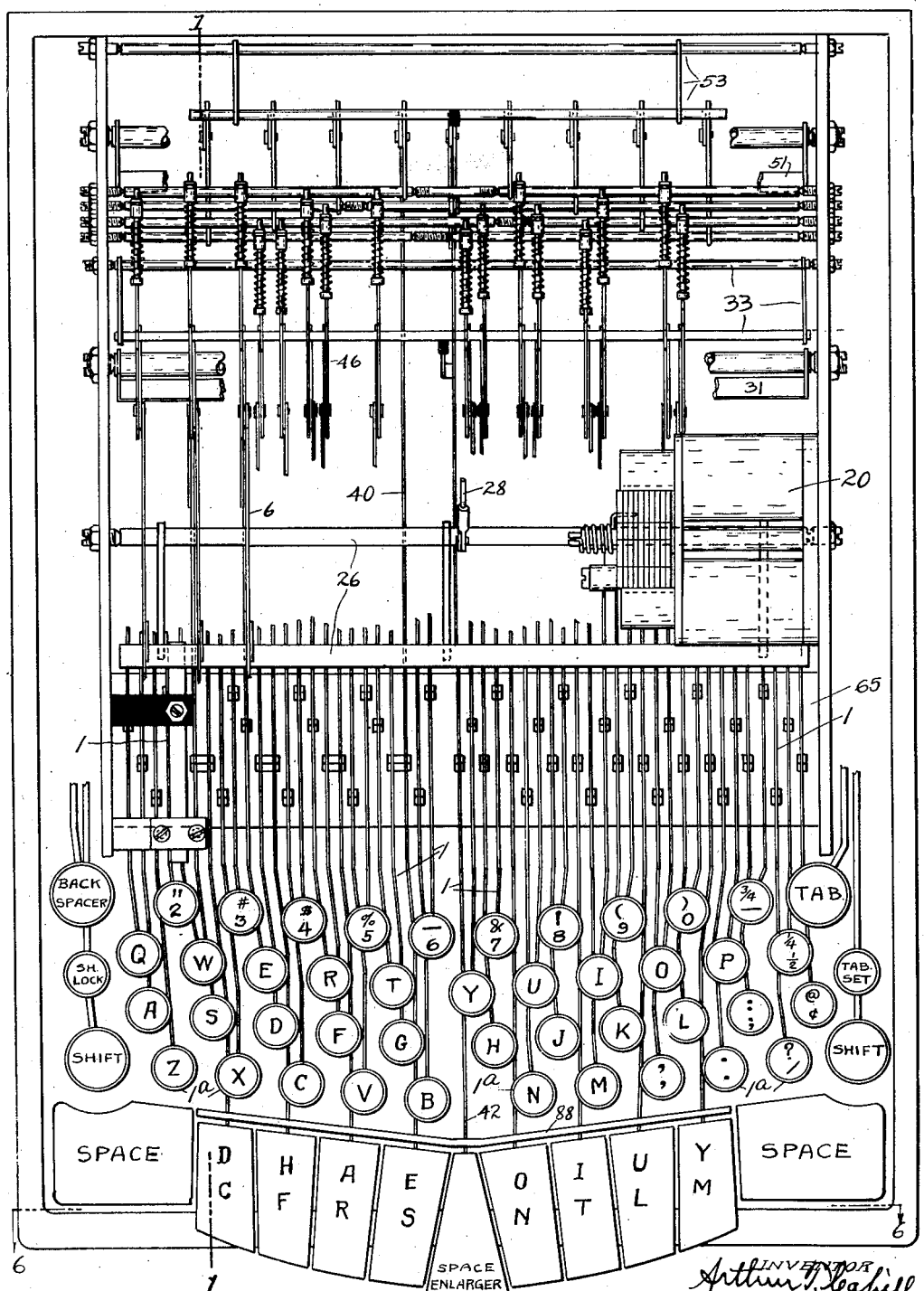
Fig. 4 is a horizontal section on the line 4—4 of Fig. 1, with certain parts omitted for clarity.

Since the underlying principle that makes most of these inventions possible is the almost automatic alternating of vowels and consonants and consonants and vowels, which enables each thumb key to produce two letters instead of one, and each of these two letters in two relations or positions with regard to the letter that has preceded it, as the letter may follow either a vowel or a consonant, it would, of course, be possible to make these alternations or reversals by hand, as will be pointed out later. But this would involve a tremendous amount of extra mental labor on the part of the operator and a very much more difficult technique, which would probably slow things up so much that there would be no particular gain. It is, therefore, desirable and necessary, if the machine is to be easy to operate and capable of very great speed, to have the machine do all the thinking and all the work in connection with the reversals for the operator. In other words, to have the machine do it automatically, without any thought or effort on the part of the operator. I accomplish this as follows:

All the key reeds on the universal keyboard, excepting only the key reeds of the letter keys, are made smooth on top and bottom just as they are now, while all the key reeds which represent letters and letters alone, in the three other rows, have projections upon them which, when these keys are depressed, operate one or the other of two contact frames. The key reeds representing the five vowels, a, e, i, o, u, and the additional consonants which behave like vowels, such as d, h and y, shown in the top row on the thumb keys in the keyboard drawings, Figs. 4, 17 and 21, all carry projections, 1b, 1b, upon them, which are in one line crosswise of the machine, and all of which operate the same contact frame 61—the vowel operated frame which closes the circuit of the consonant releasing magnet 61a—while all the remaining letter key reeds (those representing the remaining eighteen consonants) carry projections, 1c, 1c, upon them, in another line crosswise of the machine, which, when any of those keys are depressed, will actuate the contact frame 60—the consonant operated frame—which closes the circuit of the other releasing magnet 60a—the magnet which releases the vowels and letters which behave like vowels. All the other keys on the keyboard, except the letter keys, remain as they are now without any projections upon them, since no reversals are necessary in their case.

The actions of the key reeds 1, 1, key reed extensions 2, 2, jacks 3, 3, bell crank levers 4, 4, levers 5, 5, push pieces 6, 6, pendants 7, 7, levers 8, 8, pull-down wires 9, 9, motor magnet 20, motor frame 26, knock-out frame 31, space actuating push rod 28, etc., are similar to those shown in the patent of my late brother, Dr. Thaddeus Cahill, No. 1,197,103, filed November 4, 1899, but not issued until September 5, 1916, and which we used in our electrical typewriters with such eminent success, and which are capable of almost unlimited speed. They are very simple, inexpensive, direct, positive, and quiet in action. They involve a minimum of simple parts and can not easily be improved upon. In fact, none of the electrical machines put upon the market since that time approach them in the above characteristics.

Since this is already a part of the art, I will describe it only very briefly here:

When the operator's finger touches the letter key, the key reed in the rear of the fulcrum 65 rises, pushing upward the jack 3, which in turn actuates the bell crank lever 4, which revolves on the rod 4ª, and whose pin 4ᵇ, resting in contact with the lever 5, which is also mounted and oscillates on the rod 4ª, shoves the same before it. The lever 5, being pivoted to the push rod 6, shoves it before it and throws the pendant 7 over the motor frame 26. Meanwhile, as the rear end of the bell crank 4 has been pushed upward, the contact frame 33, Fig. 2, resting upon the tails of the bell cranks 4, has been pushed upward, and the downwardly extending arm of the contact frame has closed the circuit of the motor magnet 20, which pulls up the motor frame 26, bringing it into contact with the pendant 7, which has been thrown over it by the action of the finger, and shoves said pendant before it. The pendant 7 pushes up the rearward end of the lever 8, whose front end pulls down the pull-down wire 9, which actuates the lever 10, which in turn actuates the pull wire 11, connected to the type bar 12, which revolves on the rod 12ª, and so throws the type bar against the platen. Meanwhile, as the motor frame 26 has risen, throwing up the pendant and through the chain of parts, throwing the type bar against the platen, the knock-out frame 31, which is actuated by the arm 29, carried on the motor frame shaft or tube, through the push rod 30, has been thrown backward, and has knocked the jack 3 off the rearward extension 2 of the key which has been depressed. This allows the bell crank 4 to drop, and the contact frame 33 to return to its normal position. This breaks the circuit of the motor magnet 20 and allows all the parts to return to their normal positions while the finger key is still being held down. This completes the printing of the first or leading letter, that which is printed upon the universal keyboard machine. In fact, the actions are so tremendously fast that they are frequently all completed—letter printed and parts returned to their normal positions—before the operator's finger has reached the bottom of the depression.

Coming now to the action of my special thumb keys: The eight key reeds, 40, 40, carry extensions 41, 41, on which the rearward oscillating rod of the frame 52 rests. The forward rotating tube 52ᵇ carries three forwardly extending arms 52ᵈ, 52ᵉ and 52ᵍ. The head of the pin 52ᵈᵈ set in the top of the upwardly and forwardly extending arm 52ᵈ, normally sustains the weight of the pawl 49 and keeps it out of contact with the link 50, when only the universal keyboard keys are being used. The forwardly and slightly upwardly extending arm 52ᵉ, carries a grooved wheel 52ᶠ, on which the link 50 rolls as it moves back and forth under the impulse of the knock-out frame 31, where only the universal keyboard keys are being used. The downwardly and forwardly extending arm 52ᵍ, withdraws the specially long jack 42ᵇ, for the double space or space enlarger thumb key reed 42. This is necessary, since this jack must work whenever it is desired to make a single letter and a space together, and the space bar is, therefore, put down simultaneously with a key on either the universal keyboard or the thumb keys. If, now, this jack were not withdrawn when the space enlarger key is put down in conjunction with a finger key on the universal keyboard machine, there would be a space after the first letter of the pair had been printed and before the second letter had printed. It is, therefore, necessary, when printing letters in pairs, that this jack be withdrawn so that the space enlarger magnet does not act until after the first letter of the pair has printed. There are two circuits, either of which actuates the space enlarger magnet. One is a simple circuit, 75, controlled by the space enlarger jack 42ᵇ alone; the other is a circuit with two breaks in it, one of which is closed at 78, when the space enlarger key is depressed in conjunction with a thumb key, and the final one is closed at 79, when either one of the releasing frames 60ᵇ or 61ᵇ acts, just before the secondary or thumb key letter prints, all of which will be explained later in more detail.

The jacks 43, 43, are similar in function to the jacks 3, 3, in that they operate the bell crank levers 44, 44, which perform the same functions as the bell cranks 4, 4, in that, through the pins 44ᵇ, they push the levers 45, 45, before them. These, in turn, push the sliding bushings 46ᵇ, 46ᵇ, before them, and so compress the springs 46ᶜ, 46ᶜ, since the push rods 46 and 47 are held from moving by the releasing frames 60ᵇ and 61ᵇ. When the selected releasing frame acts, the power stored up in the compressed spring, 46ᶜ, through the push rods 46 or 47, which press against the shoulder pivot 5ª set fast in 6, shoots the selected push rod 6 before it, and so throws the pendant 7 over the motor frame 26, ready for printing, when the circuit of the motor magnet 20 is again closed. The push rods 46, 46, correspond to vowels, and the push rods 47, 47, to consonants.

Now, since each thumb key represents two letters, it is self-evident that they cannot both print at the same time and that, therefore, there must be a holding mechanism or a selecting mechanism, which will hold one letter back and allow the selected letter to be printed.

I accomplish this as follows:

Each of my eight thumb keys represents two letters. There are, therefore, eight rock shafts, 44ª, 44ª, at the rear of the machine. Each rock shaft corresponds to the two letters on a particular thumb key, one a vowel and the other a consonant. Each rock shaft carries a bell crank 44, which is fast on to the shaft, and two arms 45, 45, which oscillate on the shaft. Some letters, such as *c* and *d*, lie very close together, and also close to the thumb key which operates them—the fourth thumb key for the left hand. It, therefore, requires only a short rock shaft. It is here again noted that *d* is one of the consonants I treat as a vowel, and so is released by the consonant operated vowel releasing frame. Therefore, this particular rock shaft is very short.

Other letters, however, represented by a thumb key, such, for instance, as *i* and *t*, lie a considerable distance from each other and also from the thumb key which operates them. These letters will require a longer rock shaft and a different positioning of the various arms. It is possible, however, by careful design and proper arrangement of the letters chosen, to work the eight rock shafts into the small space available in a standard typewriter, as shown in Figs. 1, 2, 3 and 4.

Each of the eight rock shafts, 44ª, 44ª, carries a bell crank 44, which is fast on the shaft. They each also carry two levers or arms, 45, 45, which are mounted and oscillate on the shaft 44ª, just as the levers 5, 5, do, on the rod 4ª. These levers are so positioned on the various rock shafts that they line up properly with the particular push pieces 46, 46 and 47, 47, which actuate the universal keyboard push pieces 6, 6, that correspond to the letters desired.

When a bell crank 44 is operated by one of the jacks 43, the two levers or arms 45, 45, each compress one of the springs 46ᶜ, 46ᶜ, on the push rods 46 and 47. When one of the releasing frames, operated by its magnet, has released the chosen letter, the compressed spiral spring shoots the push rod 46 or 47, which is pressing against the shoulder pivot 5ª, forward, and so shoves the push rod 6 before it. This throws the pendant 7 over the motor frame 26. Then the motor magnet, whose circuit has again been closed, acts. The knock-out frame 51 knocks the jack 43 off the key extension 41 and all the parts again return to their normal positions.

The method of operation is, therefore, as follows:

When it is desired to print two letters at a time, the appropriate letter key for the primary or leading letter of the pair is selected with the proper finger of the appropriate hand on the universal keyboard, and the secondary or following letter of the pair is selected with the appropriate thumb, and the two letter keys are then depressed simultaneously, when the universal keyboard letter immediately prints.

Since both the thumb key and the universal key should go down at the same time, the thumb key, when depressed, through the jack 43, the bell crank 44, and the two upwardly extending levers 45, 45, will compress the two springs 46ᶜ, 46ᶜ, and hold them compressed until such time as the letter represented by the finger key on the universal keyboard, has printed, when one or the other of the frames 60ᵇ or 61ᵇ—the one determined by the letter key used on the universal keyboard—will be released automatically by the machine, and the push of the compressed spring, now released, will shoot the pendant corresponding to the chosen letter over the motor frame, which will again be energized by current controlled by the thumb keys, and print the selected following or secondary letter of the pair on the thumb key.

It will be seen that the thinking mechanism of the machine, which makes all the reversals absolutely automatically and without any thought, knowledge or action whatever on the part of the operator, lies in the universal keyboard, where the vowel keys and the letters behaving like vowels carry projections, 1ᵇ, 1ᵇ, which operate the vowel operated consonant releasing frame. The rest of the alphabet, usually, but not necessarily all the consonants, carry other similar projections, 1ᶜ, 1ᶜ, lying just above the other contact frame—the consonant operated vowel releasing frame 60. These two frames close the circuits of the two releasing magnets 60ª and 61ª, one of which controls the frame that releases the vowels and letters behaving like vowels, and the other of which controls the frame that releases the consonants. That is to say, the holding frames, 60ᵇ and 61ᵇ, lie normally down on the stop 62, and in engagement with the projections 46ª and 47ª, on the push rods 46 and 47, and hold these rods from moving forward under the impulse of their springs, until one or the other releasing frame is raised by the action of a key on the universal keyboard, which selects the proper releasing magnet and sends the current through it. The pendant 7 is then shot over the motor frame, the circuit of whose magnet has again been closed and the selected thumb key letter is printed.

When a letter key on the universal keyboard is depressed, it closes the circuit of one or the other of the releasing magnets which actuate the releasing frames 60ᵇ and 61ᵇ, according to whether the controlling letter on the universal keyboard is a vowel or a consonant. But since it would not do to have either of the releasing magnets 60ª or 61ª act immediately and release its pendant, since this would throw two pendants over the motor frame and lead to the throwing up of two type bars with the trouble attendant thereon, it is necessary to have a lag in the action of the releasing magnets, which is produced by a break in the circuit, which is not closed until immediately after the printing of the primary or leading letter on the universal keyboard machine. When this break in the circuit is closed, at 77, as it is by the printing of the first letter—the leading letter on the universal keyboard—the appropriate releasing magnet immediately acts, pulling up its frame and releasing the selected push rod, either 46 or 47, which, under the action of the compressed spring 46ᶜ, shoots the pendant 7 over the motor frame, whose magnetic circuit has again been closed at 73 and 74, and the magnet energized at the same or practically the same time as the releasing magnet. Due to its much larger size, its action is somewhat slower and gives the pendant plenty of time to get in position. So the motor magnet 20 again acts, printing the second letter, and the thumb key knock-out frame 51, knocks the jack 43 off the key extension 41, when all the parts return to their normal positions.

It will be seen that the link 50 is not attached fast to the knock-out frame 31, but on the contrary, is slotted to allow the shoulder pivot 31ª to move back and forth. It also will be noted that at the forward end the slot extends upward. The method of operation is as follows:

When the primary letter has printed on the universal keyboard machine, the knock-out frame 31 is thrown backward a sufficient distance to knock the jack 3 off the key extension 2. The shoulder pin 31ª in the knock-out frame 31 shoves the link 50 before it, which moves the knock-out frame 51 back halfway. If no thumb key is down, the link 50 and the second knock-out frame 51 return to their normal positions in time with the first knock-out frame 31. If, however, a thumb key is depressed simultaneously with a key on the universal keyboard, in order to print two letters, when the leading letter on the universal keyboard prints, and the shoulder pivot 31ª in the universal keyboard knock-out frame 31, has shoved the link 50 and the thumb key knock-out frame 51, backward, to the halfway position, the pawl 49 is no longer supported by the shoulder pin 52ᵈᵈ, carried by the arm 52ᵈ, which has been rotated backwards and downwards, as the frame 52 has risen. Therefore, the pawl 49 drops down in front of the shoulder on the link 50, thus holding it and the thumb key knock-out frame 51 in halfway position. As soon as the universal keyboard knock-out frame 31 returns to its normal position, the forward end of the link 50, which has been resting on the shoulder pivot 31ª, and the grooved wheel 52ᶠ, being no longer supported by either the pivot or the grooved wheel 52ᶠ on which it rolls when no thumb key is down, drops down until the recessed upper portion comes into contact with the shoulder pivot 31ª again. Then, as the circuit of the motor magnet 20 is again closed by the motor frame at 73, the universal keyboard knock-out frame is again thrown backward, shoving ahead of it, through the link piece 50, the thumb key knock-out frame 51, which, through the arm 51ᵉ, again closes at 74, the circuit of the motor magnet 20, which again acts, printing the secondary or following letter represented by the thumb key, and also knocks the jack 43 off the extension 41 of the thumb key 40, when all the parts again return to their normal positions.

In the arrangement of the letters on the thumb keys on the accompanying drawings, 41.49% of all the letters occurring in the thumb keys will be made by the two thumb keys immediately adjacent to the space bar, the thumb key on the right hand and the thumb key on the left hand—the two thumb keys most easy to operate—while 30.15% will be made on the next two thumb keys (moving outward one key space from the space bar on each side) which are also very easy to operate. These four keys represent 71.64% of all the letters made by the thumb keys, while the next two keys, moving outwards one key space, represent but 19.15% of the total number of letters made by the thumb keys. The last two keys—the two outside thumb keys—represent only 9.21% of the letters made by the thumb keys. 50.42% will be made by the right hand and 49.58% by the left hand.

It will thus be apparent that the great majority of letters falling upon the thumb keys, can be made by a comparatively few keys, so few, in fact, that the thumbs have no difficulty in operating them. Whether this number be six, eight or ten, is optional. I have found however, that the eight keys shown, represent 98% of all the letters which could fall upon the thumb keys, and that it is easier and faster to make the remaining 2% on the universal keyboard than to endeavor to stretch the thumbs into positions which would be uncomfortable and slower for the ordinary typewriter operator. A flexible hand can operate ten keys, but on the whole, I prefer to use only eight, as the best working compromise.

Of course, it is self-evident that it is perfectly possible and quite easy to have two complete alphabets, one represented by the universal keyboard, and the other represented by thirteen thumb keys, each carrying two letters. In this case, either eight or ten thumb keys could be operated by the thumbs, and the other three or five keys by the little fingers. But from my experience, I do not consider that this is as good, as fast, or as easy to operate as the one shown in the drawings.

Since there are only about 2% of the letters which normally fall upon my thumb keys which we cannot make with eight thumb keys, and since we would only gain 2% by using the full alphabet of twenty-six letters represented by thirteen keys, which are not nearly so easy to operate, I prefer to use eight thumb keys. But I want it distinctly understood that I do not limit myself to that number or to any particular number. The exact number of keys used has nothing whatever to do with the inventions here described.

There are cases—a quite negligible number—where we have two vowels following each other, or a diphthong. There are a good many more cases, but still a small number, where we have two consonants following each other. In approximately half these cases, if not in more, the combination will be broken up owing to the letters being taken in pairs. That is, the second vowel or the second consonant will fall in the succeeding combination from the first vowel or consonant. In the comparatively few cases where they do not, a double reversal has to be made and the machine has to operate abnormally. That is to say, a vowel follows a vowel or a consonant follows a consonant.

I accomplish this result by the use of a double reversing bar, as shown in Fig. 21, or a double reversing lever or strip, as shown in Figs. 1, 3, 4, 17, 19, 20, 22 and 23. In the case of the bar proper, shown in Fig. 21, the thumb is pressed inward over this bar before it is depressed upon the thumb key and carries the thumb key and the bar down with it. In the case of the double reversing strip, shown in Figs. 1, 3, 4, 17, 19, 20, 22 and 23, the thumb is simply pressed inwards a small fraction of an inch and carries this bar before it the very small distance necessary to make an electrical contact. This action I have found by experience is much better and faster, since it is simpler, and the inward motion of the thumb is more natural, in that it does not have to be nearly so great as in the case of the bar, and also in that the two actions, inward and downward, are combined into one inward, downward action, which is much easier. The action of this double reversing strip or bar is to break the normal circuits of the vowel and consonant operated releasing frames 60 and 61, and to close them in an abnormal way, which will just reverse their normal actions, so that a vowel will follow a vowel, or a consonant a consonant. One easy method of accomplishing this is shown, and will be readily understood by referring to Figs. 3 and 24. In these drawings, I show a double spring contactor with two spring arms, 82 and 83, each of which arms carries a contactor $82^a$ or $83^a$, long enough to cover two points, and so close a break in the circuit of the releasing magnets $60^a$ and $61^a$. Normally, these contactors remain in the backward position and the machine works normally. When, however, the operator's thumb shoves the double reversing lever inward, the contactors, being below the center on which the frame oscillates, are shoved forward, breaking the normal connections to the releasing magnets $60^a$ and $61^a$, and establishing new connections to these same magnets, but the circuits in the new paths are reversed, so that the machine now acts abnormally. That is to say, the releasing magnet $60^a$ will act instead of the magnet $61^a$, and vice versa. Of course, similar results can be obtained in other ways, and I by no means limit myself to the methods shown, but want full protection.

*The thumb key and double reversing lever holding and releasing mechanism*

85 is the releasing frame for the thumb keys. It consists of a shaft 85, to which two upwardly extending arms $85^a$, $85^a$, are made fast. These arms carry between them a wire, $85^b$, which when the frame 85 acts, moves forward, and knocks the dogs $87^a$, $87^a$, off the forward extension of the thumb key reeds, 40, 40. This shaft 85 also carries fast on itself a downwardly extending arm $85^d$. It also carries an upwardly extending arm $85^c$, which also is fast on 85.

87 is a rod on which the dogs $87^a$, $87^a$, and $87^c$, are mounted loosely. The whistler springs $87^b$, $87^b$, are also mounted loosely on the rod 87. One end presses against the dog and the other end against the main frame.

When a thumb key is depressed, the whistler spring $87^b$ throws the dog $87^a$ over the extension on the end of the thumb key reed 40, so holding the key reed down until the letter on the universal keyboard has printed and a thumb key letter has also printed, when the action of the thumb key knock-out frame 51, through the pull rod 86, pulling against the lower arm 85ᵈ, throws the wire 85ᵇ forward and so knocks the dog 87ᵃ, off the extension on the front of the thumb key reed, and thus releases same, which returns to its normal position.

88 is the double reversing lever.

88ᵃ is the rod pivoted on trunnion bearings.

88ᵇ is a small casting, fast on the rod 88ᵃ, to which the double reversing lever 88 is made fast. To the lower end of this casting, a catch 88ᶜ is made fast.

87ᶜ is a dog loose on 87, and resting on the upward end of the arm 85ᶜ, when the double reversing lever 88 is shoved inward slightly, so that the contactors 82 and 83 are in the reverse position. This dog 87ᶜ drops down behind the catch 88ᶜ and holds it until released by the action of the thumb key knockout frame 51, through the pull piece 86. When the pull piece 86 acts, the arm 85ᶜ is forced forward and upward and so raises the dog 87ᶜ, releasing the catch 88ᶜ, and so allowing the frame 88 to return to its normal position.

89 is the hand releasing means, by touching which the operator can, if desired, operate the frame 85, and so release any thumb key which has been depressed and the double reversing lever 88 also, if it has been used.

The single and double spacer mechanism

Figure 2:
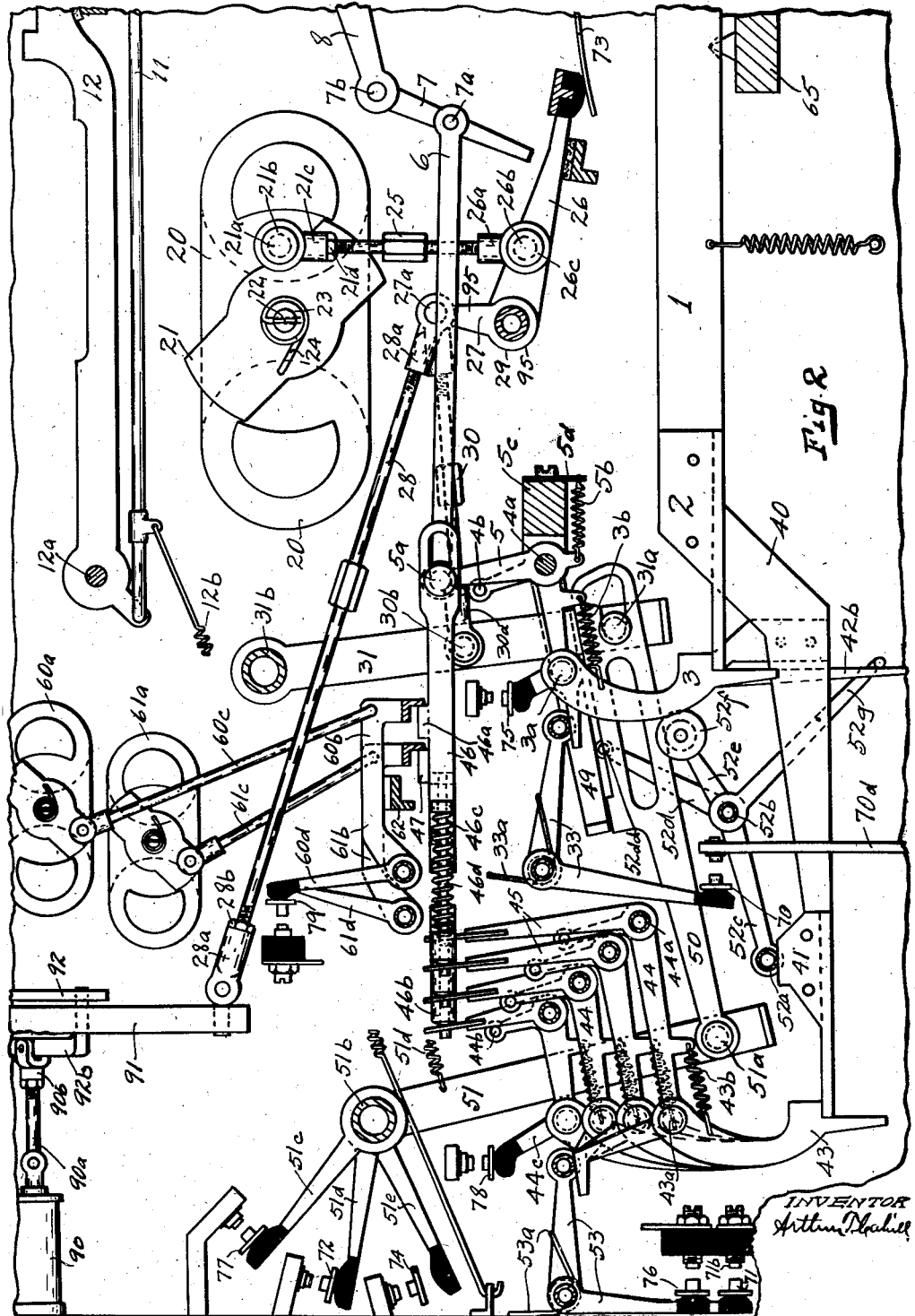

While it has heretofore been proposed broadly to form the double space after a word simultaneously with the last letter, my present invention includes novel means by which a single and double spacer mechanism can be worked very simply into the star wheel mechanism, for use on modern typewriters. This is shown in Figs. 1, 2 and 28, and in more detail in Figs. 28A and 28B, in which 91 is the oscillating plate, which carries the space dogs, their stops, operating springs, etc. This plate is set on trunnions at 91ᵃ, 91ᵃ.

92 is the fly dog, pivoted at 92ᵃ, which, under the action of the spring 92ᵈ, is normally pulled backward against the movable stop 92ᵇ, which allows the carriage to move one tooth space at a time. When this stop 92ᵇ is removed, as it is, by the action of the magnet 90, pulling it out of position, the fly dog 92 moves over against the fixed stop 92ᶜ. In this position, it has moved one and a fraction tooth spaces—sufficient to skip the next tooth and allow it to re-enter the star wheel and arrest same on the second next tooth instead of the next tooth. In his way, the carriage is allowed to move either one or two spaces at a time, as desired. Of course, it is self-evident that the little lever, 92ᵇ, may be operated by the finger instead of by outside power, if that is desired, and I want full protection, whether this lever be manually operated or power operated.

In the present typewriting machines, the carriage, when thrown back, strikes a positive rigid stop, which arrests its motion practically instantly with a heavy bang, which is a nuisance to the operator and other people in the office. This is particularly true where the carriage is returned by an outside power, and not by hand. This is entirely unnecessary. In my machine, the marginal stop, instead of striking a rigid object and being brought instantly to rest, strikes a spring, dashpot or other shock-arresting device, which takes the most of the momentum out of the carriage in a very short travel and then allows the carriage to be brought gently and quietly to a stop against the fixed stop, so that it will always come to rest at the same point. Of course, very fast operators throw the carriage back faster than slow operators, and it is advisable to have an easy means of adjustment so that the individual operator can quickly and easily adjust the spring or other slowing down resistance to meet personal requirements.

This adjustment can be made easily and quickly either by adjusting the needle valve of a dashpot, or by adjusting the screws, 93ᵃ, 93ᵃ, in Fig. 25, so as to bring the springs 94 and 94ᵃ closer to or further away from the fixed stop 93. In this type of construction, I use two springs, one behind the other, the carriage first striking the spring 94ᵃ and pressing same against the spring 94, which, of course, materially increases the resistance or carriage stopping action. The springs 94 and 94ᵃ are tempered on an arc and stand away from the screws 93ᵃ, 93ᵃ, until the carriage moves them back against these screws, after which, of course, as will be readily seen, the tension of the springs is very much stiffer. The spring 94 has a hole in it sufficiently large to allow the screw 93ᵃ to pass through it towards the spring 94ᵃ, thereby giving each spring an individual adjustment. As will be seen, due to the shorter length of the spring 94 beyond this screw, it will be very much stiffer than the spring 94ᵃ in its first position, but the spring 94ᵃ also will become much stiffer when it strikes the screw 93ᵃ, on account of the greatly reduced length of the springs above that point.

The noise suppressing device such as described may be mounted on the lever now commonly provided on modern machines, rising from a projection on the main frame, and against which the marginal stop abuts. Other mechanically equivalent constructions for this shock-arresting and noise suppressing device may be employed such for example as a dashpot having small apertures for releasing the air and a needle valve for controlling the balance of the air, or other spring arrangements such for example as a plurality of concentric or otherwise disposed compression springs of the coil type, projecting toward the carriage to different extents, so as to act successively and cumulatively. In the described manner the noise of the "bang" of the carriage may be reduced to about $\frac{1}{10}$ of that usual, by simple and inexpensive means which will work for long periods and not get out of order.

Remarkable gain in speed due to using a legato touch

Figs. 26 and 27 show graphically the enormous gain in speed or work produced in a given time, that results from using a genuine legato touch instead of a staccato touch. In every case the time represented by any of the lines a, a, is the same.

In Fig. 26, the top line represents twelve staccato actions or units of time with the lowest possible loss between each action, and the operator's finger must be jerked up instantly in order to release the type bar which is rigidly connected to the finger key, and each action must be completed before the next commences. The second line—the slanting line—made up of lines of exactly the same lengths as before, but which overlap each other only one-third, clearly shows how, still giving each action the same amount of time as before, but using an easy legato or overlapping touch, with only one-third overlap, 50% more actions, or eighteen in all, are produced.

In this case, the operator's finger is not jerked off the key instantly, but rests upon it for a time. There is now no necessity for jerking the finger off the key, since the connection between my key and the type bar has been broken by the printing of the letter, and this condition is not re-established again until the key returns to its normal position. In fact, it is this positive connection-breaking, or releasing action, introduced through the jacks 3 and 43, which make the legato action possible.

In Fig. 27, the upper straight line, as in Fig. 26, represents twelve staccato actions or units of time, while the lower slanting line represents twenty-four—just twice as many actions or units of time of the same length—because an easy legato touch overlapping 50%, has been used.

In other words, if an easy legato touch with a 50% overlap is used—something very easy to do—double the amount of work will be turned out in the same time without speeding up the individual finger actions one particle, and besides, the nervous strain using a legato touch, is only a fraction of what it is using a staccato touch.

The main objectives of my invention may be further promoted by the provision of a keyboard arrangement, two examples of which are illustrated in Figs. 22 and 23 respectively and also as to certain aspects in Figs. 17 to 20, involving a somewhat separated and preferably angular relation for approximately the left and right half portions of the keyboard, together with other features of key distribution, taking into account the natural and most comfortable positioning of the operator's forearms, wrists, hands and fingers, relative length of fingers and other manual characteristics. A main feature of such arrangement involves the offsetting of the right-hand half and the left-hand half of the universal keyboard at an angle preferably of about 12½° to 15° from a line drawn through the center of the machine from front to back, that is, making these two half sections stand at an angle of about 25° to 30° relative to each other. Such arrangement tends to reduce the necessary extent of finger movement from one key to another, whether it be in and out, up and down, or sidewise, contributing materially to the totally resultant operating ease flowing from the provision of my light-touch, legato action, shallow depression, power-operation of the machine.

As the power source my invention contemplates, in lieu of electric motors of the ordinary type, an electro-magnetic device which I herein refer to as a rotary magnet. The motion of the armature of this magnet is purely rotary, through an arc of about 12° to 15° and, therefore, it is absolutely quiet. I also use a cloth felt bushing between the armature stud 21ᵃ and the connecting head 21ᶜ, to suppress any possible slight sound which might arise at this point, just as the makers of high-grade piano actions do. I also use the same means for suppressing noise at the motor frame, where the connecting head 26ᵃ is attached to the stud 26ᵇ and the motor frame 26. The motor frame, as it returns to its normal position, drops back on a long and wide piece of felt or soft rubber, extending across the machine. All this makes the action exceedingly noiseless, leaving nothing to be heard but the tap, tap, tap of the type bars on the platen.

These improvements totally remove the incessant, nerve-wracking hum of the motor, with its objectionable heat and smell of oil. They eliminate the noise and resulting nerve strain in the use of an electrical typewriter, and particularly so in an office where several are being used simultaneously.

The source of power

Since alternating current is coming into general use in the business sections of cities, and since direct current is still found in many places, it is very important—almost necessary—to have a machine which will operate on either alternating current or direct current. I accomplish this by the use of a two-way switch which, when thrown in one position, will allow direct current, if the machine is operating on direct current, to go directly through the variable resistance to the magnet. When thrown in the other position, if the machine is operating on alternating current, it will allow the alternating current to go first through a rectifier, such as is used so commonly in radio sets to furnish direct current to those parts of the sets which require direct current, even though the set is operating off of alternating current. In this way, the machine can, at a touch of a finger, be set to operate perfectly on either alternating current or direct current.

As to the electrical circuits

The primary circuit of the motor magnet 20, which is operated by the universal keyboard keys, is a simple circuit. It is closed by the contact frame 33, at 70, which, as will be seen on the wiring diagram (see diagrammatic Fig. 24) completes the circuit and allows the electricity to flow, thus energizing the magnet and printing the universal keyboard letter. The action of the magnet in printing the letter, through the knockout frame 31, knocks the jack 33 off the extension 2 of the key reed 1, which allows the contact frame 33 to return to its normal position, so breaking the circuit at 70.

The secondary circuit of the motor magnet 20, that which is controlled by the thumb keys, is more complicated. When a key on the universal keyboard and a thumb key are put down simultaneously, the key on the universal keyboard prints its letter through the simple primary circuit of the motor magnet above described.

Meanwhile, the first action of the magnet 20, in printing the universal keyboard letter, has thrown the knockout frame 51 into the half way position, where it is held by the pawl 49. This action, through the arm 51ᵈ, has closed the secondary motor circuit at 72, which is a break in the secondary circuit of the motor maget 20.

Now, when the motor magnet 20 acts, the first time, and pulls up the motor frame 26, the spring 73, as it goes up, breaks the contact at 73 until such time as the action of the magnet and motor frame have been completed and the first letter has printed and the frame has returned part of the distance to its stop. At this point, it re-establishes the contact at 73, which allows the current to pass through the contact at 72, so completing the circuit of the motor magnet 20, which acts a second time to print the thumb key letter. But as the motor frame goes up the second time, it breaks the contact at 73 which has now, through the action of the arm 51ᶜ, of the knockout frame 51, which is moving in to knock the jack off the key, closed the circuit at 74. This circuit at 74 is closed, of course, before the circuit at 73 is broken. As soon as the motor frame has completed its upward travel and the letter has printed, the knockout frame 51 knocks the jack 43 off the key and all parts return to their normal positions.

The circuit of the consonant operated vowel releasing frame 60 is closed by the action of the keys of the universal keyboard, at 81. The circuit of the vowel operated consonant releasing frame 61, is closed by the action of the keys of the universal keyboard, at 80.

The circuits 80 and 81 are also not simple circuits. There are two breaks in their common returns, one at 76 and the other at 77. These breaks are inserted to prevent the releasing magnets from acting when letters are being printed on the universal keyboard. Otherwise, the releasing magnets, with their releasing frames, would be jiggling back and forth uselessly every time that a letter was printed on the universal keyboard machine.

The first break in the common return of the circuits, 60 and 61, is closed at 76, as soon as the thumb key is put down, but the second break in the circuit, the one at 77, is not closed until the printing of the universal keyboard letter has thrown the knockout frame 51 into the half way position, where it is held by the pawl 49. This completes the circuit, and the selected magnet, either 60ª or 61ª, acts immediately.

When a double reversal is desired to permit a vowel to follow a vowel or a consonant to follow a consonant, the double reversing lever 88 is pressed inward slightly by the thumb, and this action causes the contactors 82 and 83 to break the normal contacts and to re-establish them in a reverse position. That is to say, the wiring which normally goes to 60ª, is reversed and the current passes through the magnet 61ª instead of 60ª, and the same with the other magnet.

The space enlarger circuit for the universal keyboard, is closed at 75 by the action of the jack 42ᵇ, and the bell crank 42ᶜ. The circuit for the space enlarger magnet for the thumb keys is not a simple circuit, but has two breaks in it, one at 78 and the other at 79. When a thumb key is depressed in conjunction with a universal keyboard key, the arm 52ᵍ of the frame 52, pulls the long jack 42ᵇ backward off the key extension 42ª, so that it is not operated by the universal keyboard keys, which normally close the circuit at 75. Now, however, the circuit is first closed at 78, by the action of the special insulated bell crank 44ᶜ. The circuit, however, remains open at 79 until either of the magnets, 60ª or 61ª, acts, when either of the arms, 60ᵈ or 61ᵈ, closes the last gap in the circuit at 79.

The circuit of the single spacer is closed at 84 by 64. This is a complete circuit with no other break in it and merely closes the circuit of the motor magnet 20, which acts, pulling up the motor frame 26 and through the link 28, actuating the space mechanism, and so making a space.

This invention, while applicable to machines which are wholly manually-operated, is best suited to power-operated machines, such as electrical typewriters.

I consider electricity is the best means of controlling and actuating the mechanical devices necessary to the operation of my machine, and as that is the type of mechanism which I generally use, I am showing that type of mechanism. Of course, it is self-evident to anyone skilled in the art that somewhat similar results can be obtained by the use of friction drivers, by the use of pneumatics, by the use of electro-pneumatics, or in various other ways. All the principles of my invention are equally applicable to manual operation or to power operation, and to one kind of power or another. The exact details of mechanical application would, of course, vary slightly with whatever form of power is used, and the habits of the designer employed. There are now many men who are skilled in the typewriter art, to whom such variations would be obvious. Many forms of application can be devised, the principle of this part of the invention consisting in combining with a full keyboard which contains a complete alphabet, all the numbers from 1 to 9, and all the punctuation marks and other characters, such as are included in the well-known, standard universal keyboard now in general use, a number of thumb keys, smaller than the alphabet, whether that number be five, six, eight, ten or thirteen (each of which represents two or more letters, one of which is selected to be printed by the printing of the preceding letter on the universal keyboard), the thumb keys being located in such a way as to be conveniently operable with the main or universal keyboard.

The mechanisms of the machine they control, whether that machine be electrical, or operated by any other source of power, or wholly mechanical and operated by the hands alone, are so arranged that if a vowel is printed on the primary keyboard, the connections or mechanisms are automatically and instantly shifted so that the letter printed on the secondary set will be a consonant, and if a consonant is printed on the primary keyboard, the connections or mechanisms will automatically shift or reverse, so that the thumb key will print a vowel instead of a consonant.

It will, I believe, be perfectly evident to one skilled in the art that these electrical reversals above referred to, and which are partly electrical and partly mechanical, may be made entirely mechanical, or entirely manual. But in neither of these cases will the machine be so smooth in operation, so fast, or so easy to operate.

The method of operation of my manually-operated typewriter, one merely exemplary form of which is shown in Fig. 28, is in general the same as my power-operated typewriter, with this difference; in my power-operated typewriter, a slight depression and very light touch is all that is required, whereas in my manually operated typewriter a larger depression is necessary and a heavier touch required to actuate the springs and levers which operate the type bars.

While the same general principles and same mechanisms, in so far as possible, are used in my manually-operated machine, there are, of course, some differences of detail in application. The actions of the universal keyboard keys, through the jacks, bell cranks, push levers, etc., are direct and operate as is clearly illustrated in Fig. 28.

The double reversing levers, instead of being operated by projections on the key reeds underneath, are operated by projections on the top of the key reeds, and since they are not electrical, are moved bodily forward and backward over these projections.

The thumb keys operate upon the principle of energizing a spring or springs, when the thumb key is put down and releasing the energy of these springs when the universal keyboard letter has printed, to print the thumb key letter.

When a thumb key is put down, the holding frames 187 and 188 hold the push rods 177 and 178 from moving forward. The whistler spring 175 has, however, been compressed by the depression of a thumb key, which is held down by the latch 200 until the universal keyboard key has printed, when the energy stored up in the whistler spring 175 is released by one or the other of the releasing frames 187 or 188, when the energy stored in the whistler spring immediately shoots the push rod 177 forward, and through the chain of parts, prints the letter.

The universal keyboard knockout frame 165 is thrown forward against the resistance of the spring 166 by the pin in the bell crank lever 164, acting on the cam-shaped arm of the knockout frame. Under the pull of the spring 166, the knockout frame swings backward, knocking the jack off the key extension 152, and allows all parts to return to their normal positions.

When the thumb key is depressed, the rearward end of the bell crank 174 raises the short lower end of the bell crank 181 through a pin set in same, resting on the tail of the bell crank. As this pin is shoved upward, the pin in the upper arm of the bell crank is swung away from the short arm of the knockout frame 182, which is then free to strike in and knock the jack off the key lever, so far as the bell crank 181 is concerned, but it is held by the latch 182ª. The printing of the first letter knocks the forward end of this lever down through the action of the downward projection on the push rod 177. This throws the back end upward and so releases the knockout frame 182, which then, under the influence of the spring 183, proceeds to knock the jack 173 off the key extension 172, and all parts return to their normal positions. Then the bell crank 181, under the influence of the spring 181ª, draws same forward, when the pin in 181 impinges upon the short arm of the knockout frame 182, and shoves it downward, so shoving the lower part of the knockout frame forward, and allowing the latch 182ª to re-engage, when all parts are ready for the next action.

My invention is not limited to the exemplary embodiments herein illustrated or described, its scope being pointed out in the appended claims.

I claim:

1. In a typewriting or the like machine, in combination, a platen for presenting sheet material in visible position to be marked on, a plurality of pivoted type-bars for effecting such visible marking, a set of primary keys for controlling corresponding type-bars, actuating means for the type-bars including for each a variably positionable intermediate member operatively connected with it, a rotary-armatured electro-magnetic device having a frame element connected with its rotary armature for operating said type-bars by engagement with their intermediate members, key-associated mechanism including key reeds, jacks engageable thereby, and lever and link connections between the jacks and said intermediate members whereby depression of the selected key with a legato action positionally conditions the intermediate member of the actuating means of the corresponding type-bar for engagement and operation by said rotary-armatured electro-magnetic device, associated key-controlled circuit-closing means for energizing said electromagnetic device to cause it to engage and operate the respective intermediate members when so positionally conditioned, knock-off mechanism operable upon said circuit-closing means and upon the jacks, link and lever connections between the electro-magnetic device and said knock-off mechanism whereby the latter is effective automatically to deenergize said device upon operation of a type-bar thereby and also to release the jack from the reed of the selected key which was depressed and whether or not said key has been released, a set of secondary keys disposed for operation by the operator's thumbs, said secondary-key-set representing and associated with a selected number of said type-bars and their letters less than the total number thereof, operation-effecting means for said secondary-key-set type-bars conditionable under the joint control of the secondary keys and the primary key reeds and including circuit-closing devices for said rotary-armatured electro-magnetic device and connections with the intermediate members of said secondary-key-set type-bars, and means rendering said secondary-key-set operation-effecting means responsive to a type-bar operation initiated by a primary key, whereby operation of said operation-effecting means is subject to occurrence of a type-bar operation by a primary key.

2. In a typewriting or the like machine, in combination, a rotary platen for presenting a sheet in visible position to receive printing, a plurality of type-bars mounted for upward and inward movement so as to print on a visible portion of the sheet on the platen, a primary set of keys of the standard or so-called universal type for controlling the type-bars, spacer means for the platen including a spacer key, and operating connections between said keys, the type-bars and the spacer means, said connections including for each key a connected key-reed, a jack engaged thereby, an intermediate member, lever and link connections between the jack and the intermediate member and levers and links connecting the intermediate member and the corresponding type-bar, said intermediate members having a conditioning movement from a normal inactive position to an active position and having also a type-bar operating movement, a rotary-armatured electromagnetic device having its rotary armature connected with a motor frame for engaging and effecting said type-bar-operating movement of the intermediate members in their active positions, a contact frame movable between circuit-closing and opening positions to energize and deenergize said rotary-armatured electro-magnetic device, said levers between the jacks and the intermediate members constructed and arranged also to move the contact frame to circuit-closing position upon active positioning of the corresponding intermediate member thereby to energize the electro-magnetic device and effect the type-bar-operating movement of said member, knock-off means actuated by the electro-magnetic device attendant on its type-bar operation and providing for return of the contact frame to circuit-opening position and for releasing the corresponding jack from its key-reed, a set of secondary keys disposed for operation by the operator's thumbs, said secondary-key-set representing and associated with a selected number of said type-bars and their letters less than the total number thereof, operation-effecting means for said secondary-key-set type-bars conditionable under the joint control of the secondary keys and the primary-key reeds and including circuit-closing devices for said rotary-armatured electro-magnetic device and connections with the intermediate members of said secondary-key-set type-bars, and means rendering said secondary-key-set operation-effecting means responsive to a type-bar operation initiated by a primary key, whereby operation of said operation-effecting means is subject to occurrence of a type-bar operation by a primary key, said spacer key having a similar operative connection and relation in and with respect to the spacer means as a whole as has a secondary key and the reed of the correspondingly lettered primary key, said primary, secondary and spacer keys accordingly being adapted for the production of two letters, a letter and a space or two letters and a space as appropriate by cooperative single-motion depression of a plurality of said keys.

3. A keyboard apparatus of the class including typewriting machines, said apparatus having, in combination, a plurality of pivoted instrumentalities such as type-bars each with a work-effecting portion and all arranged selectively to present their said portions at a common work-effecting location, a first set of keys each for controlling a corresponding one of said pivoted instrumentalities, intermediate members connected with the respective instrumentalities for operating them, said intermediate members having a conditioning movement between inactive and active positions and an instrumentality-operating movement, an electro-magnetic device and associated movable frame to engage and effect the operating movement of said intermediate members in their active positions, a contact frame movable between circuit-closing and opening positions to energize and deenergize the magnetic device, each of the keys having a reed and associated connections for effecting said conditioning movement of its intermediate member, said connections including a jack having connected and released positions relative to the reed and including also a lever element having a position for moving the contact frame to circuit-closing position when the intermediate member receives its conditioning movement thereby to energize the magnetic device and cause the instrumentality-operating movement of the intermediate member, knock-off means actuated by the magnetic device to shift the jacks to released position and to allow return of the contact frame to circuit-opening position, irrespective of the position of the key which initiated the particular instrumentality operation, a secondary set of keys respectively corresponding to selected most-required individual instrumentalities of those controlled by the first key set, and operating means controlled by the keys of the secondary set and associated with the intermediate members for the secondary-key-set instrumentalities, together with means for operatively conditioning said operating means by the operation of the keys of the first set and for rendering said operating means responsive to instrumentality operations initiated by the keys of the first set, for also operating said instrumentalities at the initiation of the respective secondary key subject to a precedent instrumentality operation by a primary key.

4. A keyboard apparatus according to claim 3 wherein each key of the secondary set presents a vowel-type letter and also a consonant-type letter and the associated operating means operatively conditioned by the first key set is such that vowel-type keys of the first set select the consonant-type letter of the attendantly utilized secondary key and consonant-type letters of the first set select the vowel-type letter of such secondary key.

5. A keyboard apparatus according to claim 3 wherein each key of the secondary set presents a vowel-type letter and also a consonant-type letter and the associated operating means operatively conditioned by the first key set is such that vowel-type keys of the first set select the consonant-type letter of the attendantly utilized secondary key and consonant-type letters of the first set select the vowel-type letter of such secondary key, said apparatus including in combination double reversing means having a control element readily available to the operator for reversing said normal sequence of letter types for the primary and secondary keys, to provide vowel-vowel or consonant-consonant sequence.

6. A keyboard apparatus according to claim 3 wherein there is provided in conjunction with the means for the operation of the instrumentalities at the initiation of the secondary key set mechanism withholding said instrumentalities against such operation subject to occurrence of operation of any instrumentality by a key of the first set.

7. A keyboard apparatus according to claim 3 including in combination automatic means for holding down the selected key of the secondary set pending operation of the instrumentalities as called for by the keys of both the first and the secondary set chosen for operation at the given time.

8. In a typewriting or the like machine, in combination, an assemblage of type-bars presenting all necessary vowel-type and consonant-type letters and characters, a primary or universal keyboard having a key each type-bar, actuating means under the control of each of the primary keys for operating the corresponding type-bar, a secondary set of keys, presenting letters selected from the most frequently used of those available on the type-bars and primary keys, and operating means controlled by the keys of the secondary set and associated with the actuating means of those type-bars corresponding to the letters of the secondary set, together with means for operatively conditioning said operating means by the operation of the primary keys and for rendering said operating means responsive to instrumentality operations initiated by the keys of the first set for also operating said bars under the selective control of the corresponding secondary key subsidiarily to a precedent type-bar operation by a primary key.

9. In a typewriting or the like machine, in combination, an assemblage of type-bars presenting all necessary vowel-type and consonant-type letters and characters, a primary or universal keyboard having a key for each type-bar, actuating means under the control of each of the primary keys for operating the corresponding type-bar, a secondary set of keys, each secondary key presenting two letters, one of the vowel-type and the other of the consonant type, said letters selected from the most frequently used of the two types available on the type-bars and primary keys, operating means controlled by the keys of the secondary set and associated with the actuating means of those type-bars corresponding to the letters of the secondary set, together with means for operatively conditioning said operating means by the operation of the primary keys and for rendering said operating means responsive to instrumentality operations initiated by the keys of the first set for also operating said bars under the selective control of the corresponding secondary key subsidiarily to a precedent type-bar operation by a primary key, said operating and operatively conditioning means having associated therewith mechanism automatically operative normally to determine that the type-bar for the vowel type letter of the secondary key functions in case the precedent primary-key°responsive type-bar operation is of the consonant type and vice versa.

10. In a typewriting or like machine, the combination in accordance with claim 9 including also double reversing means having a control element readily available to the operator for reversing said normal sequence of letter types for the primary and secondary keys, to provide vowel-vowel or consonant-consonant sequence.

11. In a typewriting or like machine, the combination according to claim 8 wherein the secondary-key-selected operating means for the type-bars of that key set has associated therewith withholding means preventing actuation of those type-bars in any instance until after the primary-key-initiated type-bar operation has taken place.

12. In a typewriting or like machine, the combination according to claim 8 wherein automatic means is provided to hold down the selected secondary key pending occurrence of the type-bar operations as called for both by the primary and by said secondary key.

13. In a typewriting or like machine in accordance wtih claim 9, the construction wherein the secondary set of keys is disposed for operation by the operator's thumbs and includes right and left banks for the right and left thumbs respectively.

14. In a typewriting or like machine in accordance with claim 9, the construction wherein the primary or universal keyboard includes a full complement of operating keys representing all letters and characters usual for the customary, standard or universal keyboard, said primary keys being positioned and arranged in two distinctive groups each containing approximately one-half the primary keys, said groups respectively presented for convenient operation by the right and left hands respectively, and wherein the secondary set of keys is constituted and disposed as thumb keys, said secondary set also being divided into right-hand and left-hand groups, the two groups of both the primary and the secondary sets having as a whole an outwardly divergent angular relation with respect to each other.

15. A typewriting or the like machine according to the combination of claim 8 wherein each key of the secondary set represents and is adapted to determine the operation of two different type-bars so as to produce either of the two different letters or characters carried by such two bars, the means operatively conditioned by primary-key-operation for actuating the type-bars under control of the secondary keys being so constructed and arranged that operation of a key on the primary set automatically establishes which of the two available letters or characters shall be printed by the attendantly displaced key of the secondary set.

16. In a typewriting or like machine in accordance with claim 9, the construction wherein the secondary set of keys is disposed for operation by the operator's thumbs and includes right and left banks for the right and left thumbs respectively, said secondary thumb-operable keys being serially arranged in a general direction crosswise the machine and forwardly of the primary keys so that the operator's thumb-movement in selecting a particular secondary key, in the case of either hand, is mainly sidewise of the hand.

17. A typewriting machine in accordance with the combination of claim 8 wherein the type-bar operation is effected manually through the depression of the primary and secondary keys, the primary keys serving directly to operate the type-bars as in the case of the usual manual typewriter, the associated means for operating the type-bars under the selective control of the secondary keys including spring mechanism energized by depression of the respective secondary key and released when the type-bar called and actuated by the primary key has been operated, thereby to operate the determined type-bar for the secondary key.

18. In a typewriting machine, the combinaion of a main supporting machine frame, a platen, a multiplicity of radially disposed type-bars having a common striking area upon the platen, a series of push rods, intermediate connectors actively positionable by the push rods, a series of lever and link connections between the connectors and the respective type-bars, a plural-pole rotary-armatured electro-magnetic device having a rotatively oscillatory armature, said electro-magnetic device mounted on and within the confines of the machine frame, a motor frame connected to the armature for movement thereby upon energizing the electro-magnetic device, said motor frame being commonly engageable with any actively positioned connector to actuate the corresponding type-bar, type keys and key reeds for the several type-bars, operating means including a releasable engaging element and associated pivoted lever device between each reed and the corresponding push rod, normally open contacts in circuit with the electro-magnetic device and closable to energize the latter, said operating means including provision for closing said contacts when an intermediate connector is positioned by the corresponding push rod, and means operatively connected with the motor frame to re-open said contacts and to release the particular engaging element with respect to its key reed when the type-bar actuating movement of the electro-magnetic device takes place.

19. In a typewriter or the like machine, in combination, a main supporting machine frame, a platen, a multiplicity of pivoted type-bars in basket arrangement to print at a common position at the platen, key-controlled mechanism for imparting printing movement to the type-bars comprising for each bar a movable connector adapted to be brought to active position by the key corresponding to its type-bar, lever and link connections between each connector and its type-bar, an actuating frame common to all the connectors and movable to engage and actuate the actively positioned connector and the corresponding type-bar, and a bi-polar electro-magnet mounted on and within the confines of the machine frame, said electro-magnet having a rotatively oscillatory armature connected to said actuating frame to effect said movement thereof when the magnet is energized.

20. In a typewriting machine, in combination, a main supporting machine frame, a platen, a multiplicity of type-bars commonly operable relative thereto, a type-bar activating frame, an electro-magnetic device mounted on and within the confines of the machine frame, said electro-magnetic device having an associated rotatively oscillatory armature, connections between said armature and the type-bar activating frame for moving the latter and causing the type-bars to function at the platen, depressible controlling keys for the type-bars, the latter normally being in non-connected relation with the activating frame, means controlled by the keys and acting on depression thereof to establish a connected status for the corresponding type-bar and the frame and also to institute actuation of said electro-magnetic device to move the frame thereby to operate said connected type-bar.

21. In a typewriting machine, in combination, a platen, a multiplicity of type-bars commonly operable relative thereto, a type-bar activating frame, power means to move the frame thereby to cause the type-bars to function at the platen, a primary universal set of depressible controlling keys for the type-bars, the latter normally being in non-connected relation with the activating frame, means controlled by the keys and acting on depression thereof to establish a connected status for the corresponding type-bar and the frame and also to institute actuation of the power means to move the frame thereby to operate said connected type-bar, said power means comprising a bi-polar electro-magnet and an associated rotatively oscillatory armature having operative connection with the type-bar activating frame, a secondary set of keys the letters of which are selected from the most frequently used of those available on the type-bars and primary keys, and operating means controlled by the keys of the secondary set and associated with the connected-status-establishing means of those type-bars corresponding to the letters of the secondary set, together with means for operatively conditioning said operating means by the operation of the primary keys and for rendering said operating means responsive to instrumentality operations initiated by the keys of the first set for also operating said bars under the selective control of the corresponding secondary key subsidiarily to a precedent type-bar operation by a primary key.

ARTHUR T. CAHILL.